(12) United States Patent
Li et al.

(10) Patent No.: US 11,214,878 B2
(45) Date of Patent: Jan. 4, 2022

(54) NANOSEED-INDUCED LATERAL MONOLAYERS AND VERTICAL WINGS OF TRANSITION METAL DICHALCOGENIDES

(71) Applicant: Northwestern University, Evanston, IL (US)

(72) Inventors: Yuan Li, Evanston, IL (US); Jennifer G. DiStefano, Chicago, IL (US); Xinqi Chen, Northbrook, IL (US); Vinayak P. Dravid, Glenview, IL (US)

(73) Assignee: Northwestern University, Evanston, IL (US)

( * ) Notice: Subject to any disclaimer, the term of this patent is extended or adjusted under 35 U.S.C. 154(b) by 92 days.

(21) Appl. No.: 16/749,129

(22) Filed: Jan. 22, 2020

(65) Prior Publication Data

US 2020/0232107 A1    Jul. 23, 2020

Related U.S. Application Data

(60) Provisional application No. 62/795,967, filed on Jan. 23, 2019.

(51) Int. Cl.
| | |
|---|---|
| *C25B 11/075* | (2021.01) |
| *C01B 3/06* | (2006.01) |
| *C25B 1/04* | (2021.01) |
| *C25B 11/00* | (2021.01) |
| *C25B 11/051* | (2021.01) |

(52) U.S. Cl.
CPC .............. *C25B 11/075* (2021.01); *C01B 3/06* (2013.01); *C25B 1/04* (2013.01); *C25B 11/00* (2013.01); *C25B 11/051* (2021.01); *C01B 2203/0277* (2013.01); *C01B 2203/1041* (2013.01)

(58) Field of Classification Search
CPC ... C25B 11/073; C25B 11/075; C25B 11/091; C25B 11/051; C25B 1/04; C25B 11/00; C01B 2203/1041; C01B 3/06; C01B 2203/0277
See application file for complete search history.

(56) References Cited

U.S. PATENT DOCUMENTS 8,771,822 B2    7/2014  Wang et al.

OTHER PUBLICATIONS

Jian Shi, Yukihiro Hara, Chengliang Sun, Marc A. Anderson, and Xudong Wang, "Three-Dimensional High-Density Hierarchical Nanowire Architecture for High-Performance Photoelectrochemical Electrodes", Nano Letters 2011 11 (8), 3413-3419 (Year: 2011).*

(Continued)

*Primary Examiner* — Alexander W Keeling
*Assistant Examiner* — Mofoluwaso S Jebutu
(74) *Attorney, Agent, or Firm* — Bell & Manning, LLC

(57) ABSTRACT

Functionalized substrates are provided comprising a substrate and a plurality of transition metal dichalcogenide (TMD) heterostructures on a surface of the substrate, each TMD heterostructure comprising a TMD shell over a heterogeneous nucleation site, thereby providing a core-shell heterostructure, the heterogeneous nucleation site composed of a heterogeneous nucleation material; and a TMD wing extending outwardly from the core-shell heterostructure and non-parallel to and above the substrate surface. Electrocatalytic systems comprising the functionalized substrates are also provided.

20 Claims, 11 Drawing Sheets

(56) References Cited

OTHER PUBLICATIONS

Luca Passoni et al., Hyperbranched Quasi—1D Nanostructures for Solid-State Dye-Sensitized Solar Cells, ACS Nano 2013 7 (11), 10023-10031 (Year: 2013).*

Cheng, C., Tay, Y., Hng, H., & Fan, H. (2011). Solution heteroepitaxial growth of dendritic SnO2/TiO2 hybrid nanowires. Journal of Materials Research, 26(17), 2254-2260 (Year: 2011).*

Rama Krishna Chava, Jeong Yeon Do, and Misook Kang, Smart Hybridization of Au Coupled CdS Nanorods with Few Layered MoS2 Nanosheets for High Performance Photocatalytic Hydrogen Evolution Reaction, ACS Sustainable Chemistry & Engineering 2018 6 (5), 6445-6457 (Year: 2018).*

Jeffrey D. Cain, Fengyuan Shi, Jinsong Wu, and Vinayak P. Dravid, Growth Mechanism of Transition Metal Dichalcogenide Monolayers: The Role of Self-Seeding Fullerene Nuclei, ACS Nano 2016 10 (5), 5440-5445 (Year: 2016).*

Li et al., "Morphological Engineering of Winged Au@MoS$_2$ Heterostructures for Electrocatalytic Hydrogen Evolution," Nano Lett., 2018, vol. 18, pp. 7104-7110.

Li et al., "Site-Specific Positioning and Patterning of MoS$_2$ Monolayers: The Role of Au Seeding," ACS Nano, 2018, vol. 12, pp. 8970-8976.

Li et al., "Au@MoS$_2$ Core-Shell Heterostructures with Strong Light-Matter Interactions," Nano Lett., 2016, vol. 16, pp. 7696-7702.

Li et al., "Superior Plasmonic Photodetectors Based on Au@MoS$_2$ Core-Shell Heterostructures," ACS Nano, 2017, vol. 11, pp. 10321-10329.

Shi et al., "Controllable Growth and Transfer of Monolayer MoS$_2$ on Au Foils and Its Potential Application in Hydrogen Evolution Reaction," ACS Nano, 2014, vol. 8, No. 10, p. 10196-10204.

Arend M. van der Zande et al., "Grains and grain boundaries in highly crystalline monolayer molybdenum disulphide," Nature Materials, Jun. 2013, vol. 12, pp. 554-561.

Cain, et al., "Growth Mechanism of Transition Metal Dichalcogenide Monolayers: The Role of Self-Seeding Fullerene Nuclei," ACS Nano, 2016, vol. 10, pp. 5440-5445.

Li et al., "Synthesis and characterization of vertically standing MoS$_2$ nanosheets," Scientific Reports 6, 21171: doi: 10.1038/srep21171 (2016), pp. 1-9.

Shang et al., "Lateral Versus Vertical Growth of Two-Dimensional Layered Transition-Metal Dichalcogenides: Thermodynamic Insight into MoS$_2$," Nano Lett., 2016, vol. 16, pp. 5742-5750.

Shi et al., "Hot Electron of Au Nanorods Activates the Electrocatalysis of Hydrogen Evolution on MoS$_2$ Nanosheets," J. Am. Chem. Soc., 2015, vol. 137, pp. 7365-7370.

* cited by examiner

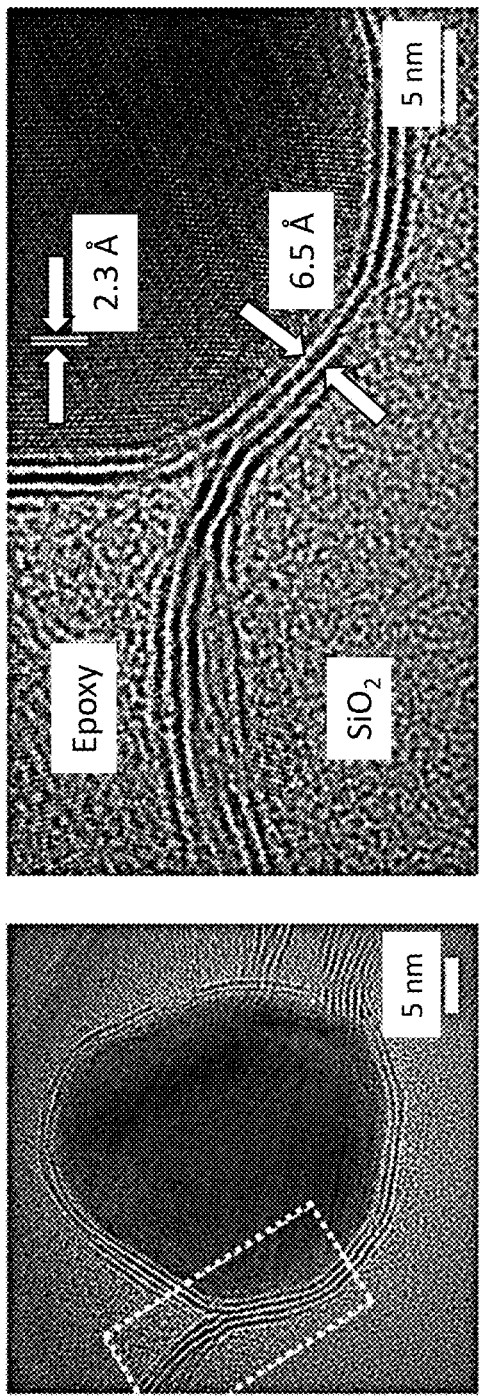
FIG. 2A
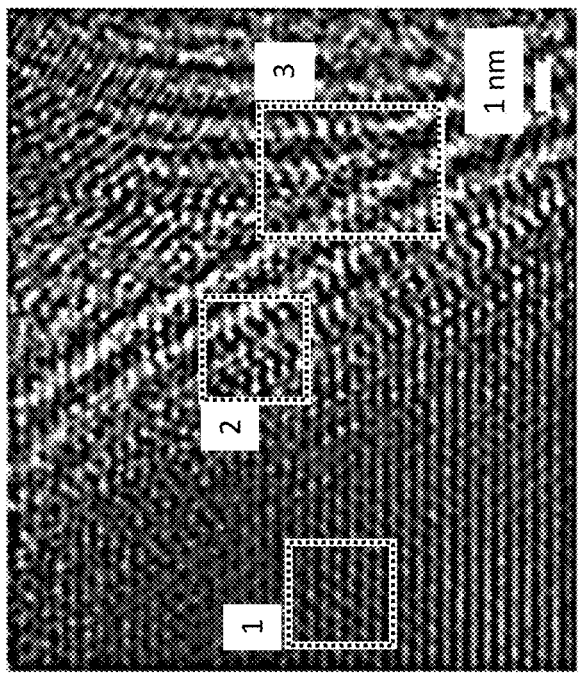
FIG. 2B
FIG. 2C

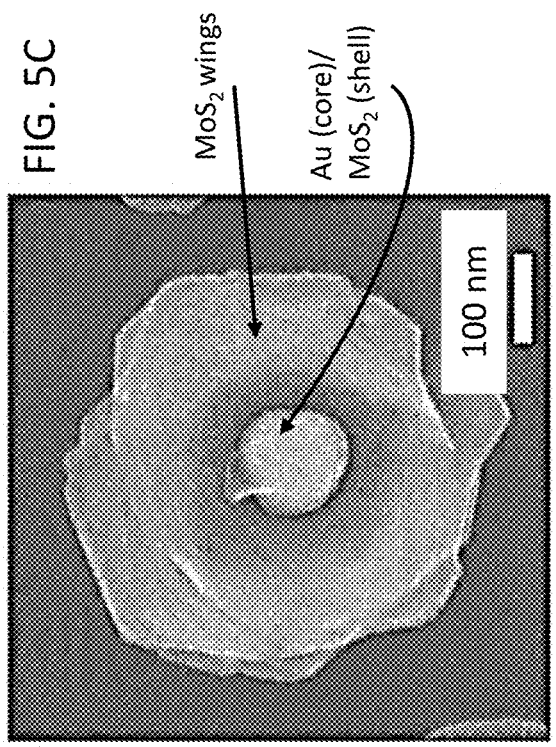
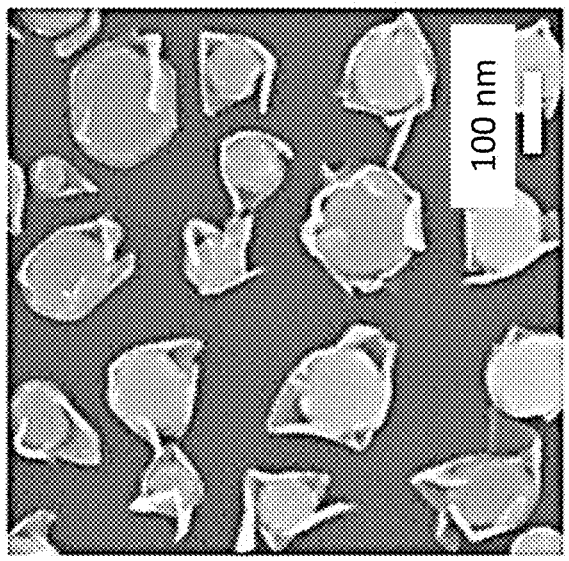
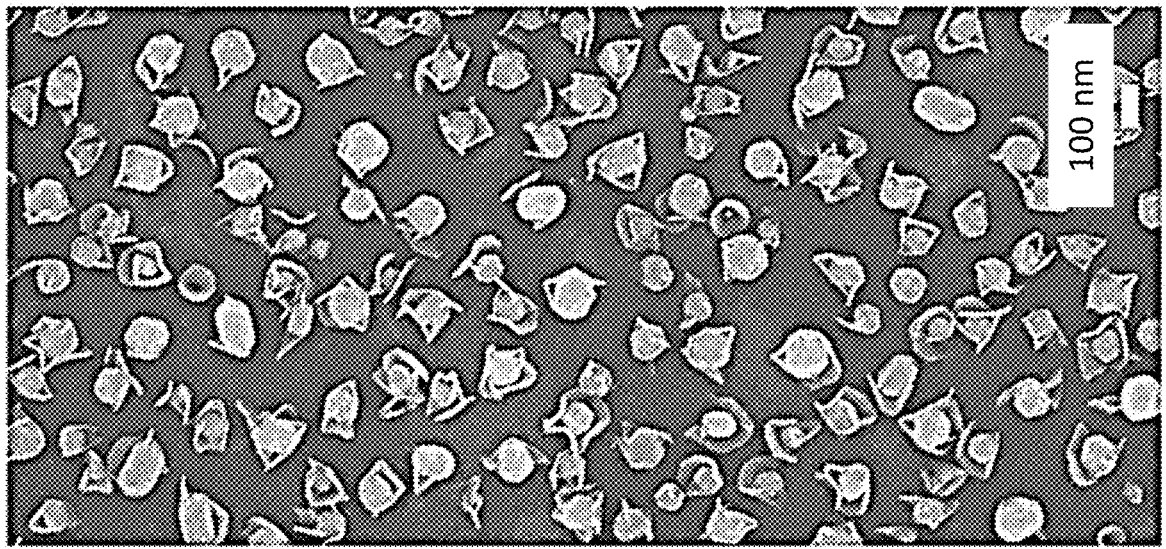

NANOSEED-INDUCED LATERAL MONOLAYERS AND VERTICAL WINGS OF TRANSITION METAL DICHALCOGENIDES

CROSS-REFERENCE TO RELATED APPLICATIONS

The present application claims priority to U.S. provisional patent application No. 62/795,967 that was filed Jan. 23, 2019, the entire contents of which are incorporated herein by reference.

REFERENCE TO GOVERNMENT RIGHTS

This invention was made with government support under DMR-1507810 awarded by the National Science Foundation. The government has certain rights in the invention.

BACKGROUND

Two-dimensional transition metal dichalcogenides (TMDs) are attractive for use in next generation electronic devices due to their unique properties and wide compatibility with current nanofabrication processes. Molybdenum disulfide ($MoS_2$), a heavily studied member of the TMD family, has drawn considerable interest due to its thickness-dependent bandgap, strong light-matter coupling, and noteworthy electronic properties, making it suitable for logic devices, integrated circuits, and optoelectronics. $MoS_2$ monolayers produced by mechanical exfoliation and conventional chemical vapor deposition (CVD) have exhibited high crystalline quality, making them promising for such electronic applications. However, the former method is plagued by very low yield, which limits its wide applicability. The CVD approach, which yields high-quality and predominantly monolayer $MoS_2$, is a promising technique for realizing large-scale industrial production, but still face challenges due to poor control over the precise position and yield of the synthesized monolayer product.

Electrochemical water splitting is an efficient and sustainable method for the large-scale production of hydrogen gas, a promising clean and renewable future energy source. The hydrogen evolution reaction (HER) can be achieved by various precious and noble metals such as Pt, Pd, and Rh; however, the scarcity and costly nature of these metals has severely limited their utility in commercial hydrogen production. Recently, $MoS_2$ has been recognized as a promising non-precious material for HER due to its natural abundance, low cost, and promising catalytic capability. However, bulk $MoS_2$ is not naturally active for HER and also shows poor conductivity for electrochemical applications; as a result, many chemical approaches including chemical exfoliation metallic 1T-$MoS_2$ conversion, and defect engineering have been explored to improve the HER performance. However, these processes generally deform the crystal structure of $MoS_2$, which can induce the formation of metastable phases and diminish its chemical stability for long-term electrolysis.

SUMMARY

Provided are methods of forming transition metal dichalcogenide (TMD) heterostructures and substrates functionalized with such heterostructures. The TMD heterostructures, functionalized substrates, and devices incorporating the heterostructures/substrates are also provided.

In one aspect, functionalized substrates are provided. In embodiments, such a functionalized substrate comprises a substrate and a plurality of transition metal dichalcogenide (TMD) heterostructures on a surface of the substrate, each TMD heterostructure comprising a TMD shell over a heterogeneous nucleation site, thereby providing a core-shell heterostructure, the heterogeneous nucleation site composed of a heterogeneous nucleation material; and a TMD wing extending outwardly from the core-shell heterostructure and non-parallel to and above the substrate surface. Electrocatalytic systems comprising the functionalized substrates and methods of using the systems are also provided.

In another aspect, methods of forming transition metal dichalcogenide (TMD) heterostructures are also provided. In embodiments, such a method comprises forming a plurality of heterogeneous nucleation sites on a surface of a substrate, the heterogeneous nucleation sites composed of a heterogeneous nucleation material; and exposing the heterogeneous nucleation sites to a vapor comprising a transition metal-containing precursor and a chalcogen-containing precursor under conditions to deposit a transition metal dichalcogenide on the heterogeneous nucleation sites via chemical vapor deposition (CVD) to form a plurality of TMD heterostructures, each TMD heterostructure comprising a TMD shell over a heterogeneous nucleation site, thereby forming a core-shell heterostructure, and a TMD wing extending outwardly from the core-shell heterostructure and non-parallel to and above the substrate surface.

Other principal features and advantages of the disclosure will become apparent to those skilled in the art upon review of the following drawings, the detailed description, and the appended claims.

BRIEF DESCRIPTION OF THE DRAWINGS

Illustrative embodiments of the disclosure will hereafter be described with reference to the accompanying drawings.

FIG. 1A shows $MoS_2$ flakes grown from individual Au seeds at the initial stage (5 min) of CVD process. FIG. 1B shows the formation of a continuous $MoS_2$ monolayer with the emergence of bi-, multi-layer flakes with an increase in the growth time (10 min).

FIGS. 2A-2C show TEM visualization of the seeding role of Au nanoparticles. FIGS. 2A, 2B show cross-section TEM images of the $MoS_2$-encapsulated Au seed; FIG. 2B corresponds to the dotted region in FIG. 2A. FIG. 2C shows high-resolution TEM images showing the bifurcation of the $MoS_2$ shell and planar sheet.

FIG. 3A shows DFT calculated surface energy ($\gamma_s$) of Au and $SiO_2$, and interface energy ($\gamma_i$) due to the combination of Au—$SiO_2$, $SiO_2$—$MoS_2$, and Au—$MoS_2$. Schematics in FIGS. 3B-3D illustrate the Au-seeded growth of $MoS_2$ layers: FIG. 3B shows the initial nucleation of $MoS_2$ at the interface of the Au seed and $MoS_2$ substrate; FIG. 3C shows the continuous formation of the $MoS_2$ shell and lateral $MoS_2$ sheet; FIG. 3D shows the final structure of Au@$MoS_2$ core-shell and the resultant planar $MoS_2$ sheet.

FIG. 4A is a schematic illustrating the geometry of the back-gated FET device. FIG. 4B is an optical image of the $MoS_2$ monolayers used as the device channel. FIG. 4C is an optical image of the patterned arrays of multiple $MoS_2$ transistors.

FIGS. 5A-5F show Au-seeded growth of w-Au@$MoS_2$ (winged Au—$MoS_2$ heterostructures) (on Si substrate).

FIGS. 5A, 5B show SEM images of w-Au@MoS$_2$ grown for 10 min. FIG. 5C shows a representative SEM image of w-Au@MoS$_2$ grown for 30 min. FIGS. 5D-5F show TEM images of w-Au@MoS$_2$.

FIG. 6A shows a SEM image showing the seeded growth of planar MoS$_2$. FIG. 6B shows a SEM image of the nanoparticle-seeded w-Au@MoS$_2$. The inset shows an individual w-Au@MoS$_2$. FIG. 6C shows a SEM image of the island-seeded w-Au@MoS$_2$. FIG. 6D shows an enlarged TEM image demonstrating the entire encapsulation of the Au island within the MoS$_2$ shell.

FIG. 7A shows linear polarization curves of Au@MoS$_2$ and w-Au@MoS$_2$ (nanoparticles/islands) on HOPG, and FIG. 7B shows the corresponding Tafel plots.

DETAILED DESCRIPTION

Figure 1A:
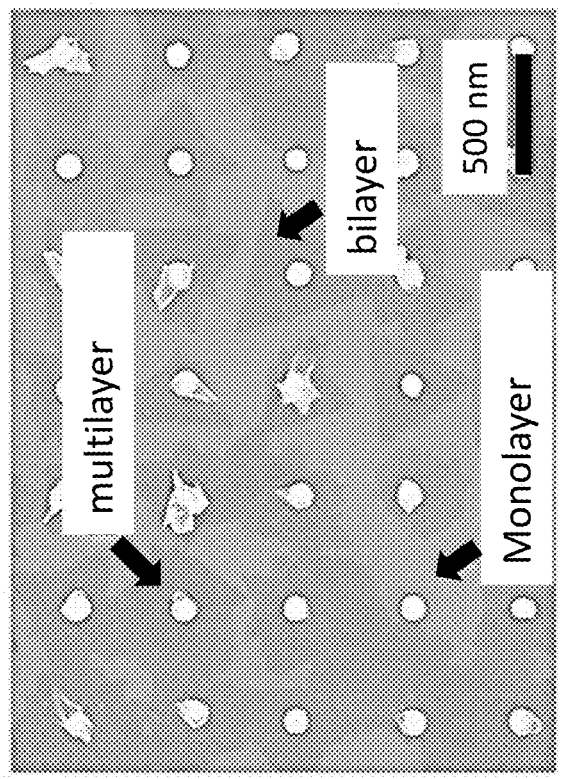
FIGS. 1A-1B show Au-seeded chemical vapor deposition of $MoS_2$.

Provided are methods of forming transition metal dichalcogenide (TMD) heterostructures and substrates functionalized with such heterostructures. The TMD heterostructures, functionalized substrates and devices incorporating the heterostructures/substrates are also provided.

In one aspect, a method of forming transition metal dichalcogenide (TMD) heterostructures is provided. In embodiments, such a method comprises forming a plurality of heterogeneous nucleation sites on a surface of a substrate. The method further comprises exposing the plurality of heterogeneous nucleation sites to a vapor comprising a transition metal-containing precursor and a chalcogen-containing precursor under conditions to deposit a transition metal dichalcogenide on the heterogeneous nucleation sites via chemical vapor deposition (CVD).

The heterogeneous nucleation sites provide preferential binding sites which induce deposition of the TMD. During CVD, a TMD shell forms over an individual heterogeneous nucleation site to provide a core-shell heterostructure, followed by TMD growth outwardly from the surface of the core-shell heterostructure. In embodiments, this growth is parallel to and along the substrate surface to provide a TMD sheet extending radially from a core-shell heterostructure center. In embodiments, the growth is non-parallel and above the substrate surface to provide one or more TMD wings projecting away from the core-shell heterostructure. The TMD wings are connected to the core-shell heterostructure at one end and terminate in a suspended, freely hanging opposing end. As further described below, the configuration (e.g., shape, dimensions, location on the substrate surface) of the heterogeneous nucleation sites as well as the CVD conditions (e.g., growth time, vapor pressures of the precursors, flow rate of a carrier gas) provide unique control over the morphology of individual TMD heterostructures as well as the coverage of the substrate surface by the TMD heterostructures. The innovation underlying the present application is, in part, related to the unexpected discovery of the TMD wing morphology and the inventors' subsequent findings of how certain CVD conditions may be optimized to achieve the TMD wing morphology. Such a morphology is highly desirable as it exposes TMD edge sites which are particularly catalytically active.

The heterogeneous nucleation sites are composed of a heterogeneous nucleation material. The term "heterogeneous" is used since the chemical composition of the heterogeneous nucleation material differs from the transition metal dichalcogenide material deposited thereon. Moreover, the heterogeneous nucleation material is not derived from the precursors, i.e., the transition metal-containing precursor and the chalcogen-containing precursor. Thus, the heterogeneous nucleation material generally does not comprise elements from these precursors or chemical compounds formed from these precursors. This is different from methods such as those disclosed in Cain et al., ACS Nano 2016, 10, 5440-5445 and Li et al., Scientific Reports, 6:21171, DOI: 10.1038/srep21171. In addition, the heterogeneous nucleation material generally has a chemical composition that differs from the underlying substrate.

The heterogeneous nucleation material may be selected to be a material that has a favorable interface energy with the transition metal dichalcogenide, e.g., an interface energy below that of the interface energy of the substrate-heterogeneous nucleation material and/or below that of the interfacial surface energy of the substrate-transition metal dichalcogenide. (See FIG. 3A.) Illustrative heterogeneous nucleation materials include precious metals such as Au, Ag, Pt, Pd, Ru, Ir, etc.; non-precious metals such as Al, Cu, Ni, Mo, Fe, Cd, Cr, etc.; inorganic materials such as Si, Ge, etc.; oxides such as RuO$_2$, CuO, MoO$_3$, SiO$_2$, etc.; organic residues such as polyethylene, polypropylene, polystyrene, polytetrafluoroethylene, polyvinyl chloride, polyaniline, hexamethyldisilazane, etc.; and nanostructured carbon materials.

The heterogeneous nucleation sites may be characterized by their shapes and dimensions. An illustrative, non-limiting shape is spherical or hemi-spherical, but these terms encompass shapes which are not perfectly spherical/hemi-spherical. Such shapes may be characterized by an average diameter. In embodiments, the average diameter is nanoscale (less than 1000 nm), e.g., in the range of from 10 nm to 1000 nm, 100 nm to 800 nm, or 200 nm to 600 nm. In embodiments, the average diameter is micron-scale (1 µm to less than 1 mm), e.g., in the range of from 1 µm to 1 mm, 10 µm to 800 µm, or 100 µm to 500 µm. An individual heterogeneous nucleation site may be composed of a plurality of nanostructures (e.g., nanoparticles) composed of the heterogeneous nucleation material. In embodiments, the heterogeneous nucleation sites may have an irregular shape. As described in Example 2, below, such heterogeneous nucleation sites may be referred to as "islands." (See also, FIG. 6C-6D.) In these embodiments, the average diameter may be taken as the maximum distance across opposing sides of the heterogeneous nucleation sites. The distribution of heterogeneous nucleation sites on the substrate surface may be random. Alternatively, the distribution may be a predetermined pattern, e.g., an array.

Figure 1B:
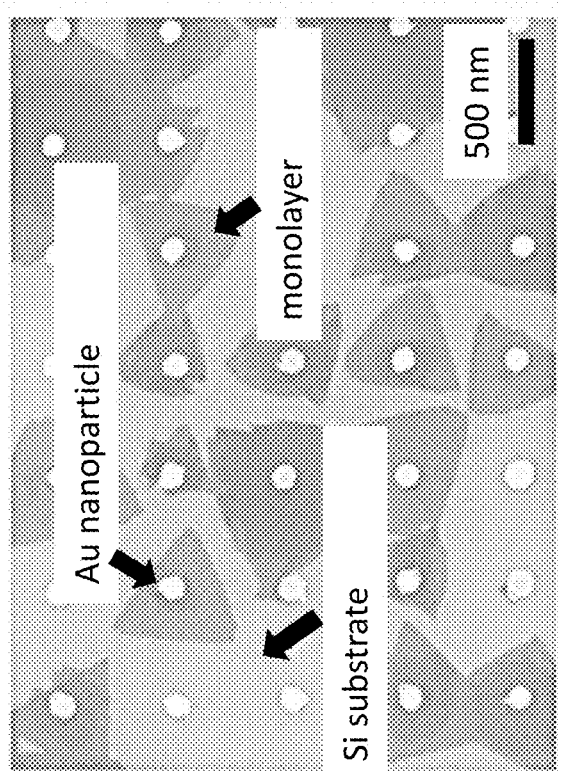

Heterogeneous nucleation sites may be formed using a variety of lithographic techniques as described in Example 1, below. Such techniques are useful for achieving predetermined patterns and heterogeneous nucleation sites having uniform shapes and dimensions. Illustrative such patterns/sites are shown in FIGS. 1A-1B. Alternatively, heterogeneous nucleation sites may be formed by first depositing a thin film of the heterogeneous nucleation material on the substrate surface. The thin film may be annealed to induce dewetting and site-formation or the dewetting/site-formation may be induced during the CVD deposition step (due to the CVD conditions). These alternative techniques are described in Example 2. They are useful for achieving heterogeneous nucleation sites which are more randomly distributed across the surface of the substrate. (See FIGS. 6A-6D.)

The density of the heterogeneous nucleation sites on the surface of the substrate may also be adjusted. In lithographic patterning, the density may be controlled, e.g., via e-beam location or masks. In thin film deposition, the density may be controlled by the thickness of the deposited thin film.

Figures 4A, 4B, 4C:
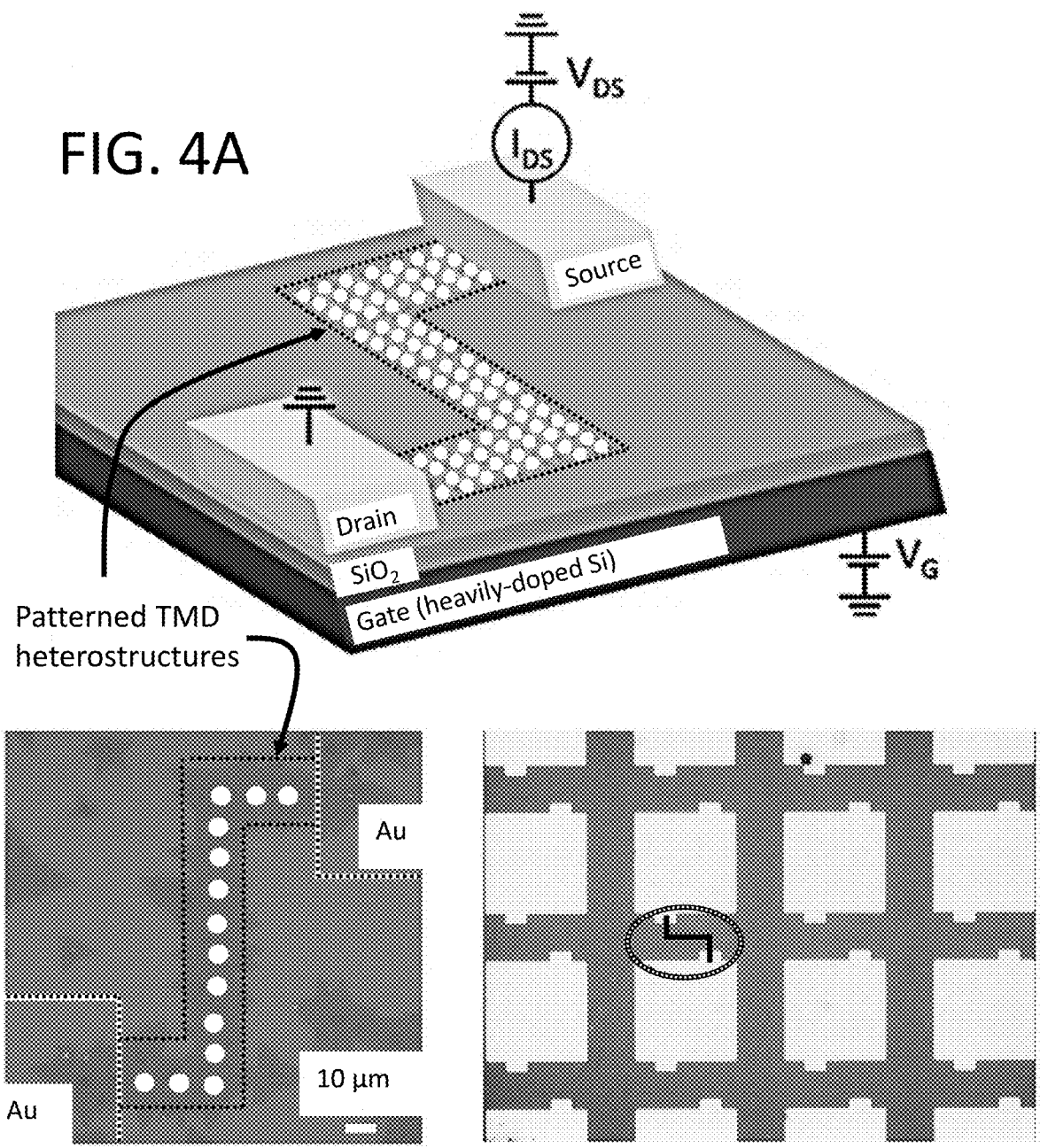
FIGS. 4A-4C show the design and fabrication of a field-effect transistor.

Each of the parameters described above may be adjusted to achieve a desired coverage of transition metal dichalcogenide on the substrate surface. Since the heterogeneous nucleation sites induce deposition of the transition metal dichalcogenide by providing preferential binding sites, the shape/dimensions/location/density on the substrate surface of the sites can be used to direct the deposition of the transition metal dichalcogenide. This is illustrated in FIG. 4A-4C showing that heterogeneous nucleation sites deposited in an "I" shape results in a layer of transition metal dichalcogenide on the substrate surface having about the same shape. This embodiment is formed from individual TMD heterostructures in which the TMD sheets extending radially from individual core-shell heterostructures have merged to cover areas of the substrate surface between neighboring core-shell heterostructures.

A variety of substrates may be used with the present methods, depending upon the application. Illustrative substrates include Si/SiO$_2$, silicon nitride, 2D materials such as graphene, MoS$_2$, WS$_2$, h-BN, and conductive substrates such as gold, graphite, etc.

The present methods may be used to deposit a variety of transition metal dichalcogenides from transition metal-containing precursors and chalcogenide-containing precursors. The transition metal dichalcogenide may have formula MX$_2$, wherein M is a transition metal and X is a chalcogen. In embodiments, M is selected from Mo, W, Bb, Ta, Ti and Re. In embodiments, X is selected from S, Se and Te. The transition metal dichalcogenide deposited may be of a single type or a combination of different types.

As noted above, during CVD, a TMD shell forms over an individual heterogeneous nucleation site to provide a core-shell heterostructure, followed by TMD growth outwardly from the surface of the core-shell heterostructure. The CVD conditions, e.g., the vapor pressure of the chalcogen-containing precursor, may be selected so that the outward growth provides a TMD sheet extending radially from the core-shell heterostructure center, the TMD sheet parallel to and in contact with the underlying substrate. (See FIGS. 1A-1B and FIG. 3D.) Generally, lower chalcogen-containing precursor flux results in TMD sheets, which occurs using a nitrogen flow rate (or other carrier gas) in the range of from 5-20 sccm and a sulfur mass of 100-150 mg (or other chalcogen). Other CVD conditions, e.g., the growth time, may be selected to tune the number of TMD monolayers in the TMD shell and TMD sheet. The number of monolayers may be 1, 2, 3, 4, 5, 6, etc. Longer growth times generally result in a greater number of monolayers. In addition, the growth time may be selected to tune the lateral extension of the TMD sheets across the substrate surface. Longer growth time may be used to increase the lateral extension and achieve merging between TMD sheets of neighboring core-shell heterostructures. Illustrative growth times include those in the range of from 5 min to 15 min.

The inventors have further discovered that certain CVD conditions, e.g., the vapor pressure of the chalcogen precursor may be adjusted so that the outward growth provides one or more TMD wings extending away from the core-shell heterostructure and above the substrate surface. Generally, higher chalcogen-containing precursor flux results in TMD wings, which occurs using a nitrogen flow rate (or other carrier gas) in the range of from 20 to 50 sccm and a sulfur mass of 300-500 mg (or other chalcogen). As with TMD sheets, other CVD conditions, e.g., the growth time, may be selected to tune the number of TMD monolayers in the TMD shell and TMD wing. The number of monolayers may be 1, 2, 3, 4, 5, 6, etc. Longer growth times generally result in a greater number of monolayers. In addition, the growth time may be selected to tune number of TMD wings extending from the core-shell heterostructure. By way of illustration, as shown in FIG. 5C, a longer growth time was used to increase the number of TMD wings. Here, the number of TMD wings is such that the TMD wings on the TMD heterostructure are reminiscent of petals on a flower. Illustrative growth times include those in the range of from 15 min to 30 min.

The TMD wings may be characterized as having an average length which may be in the range of from 50 nm to 500 nm. The average length may be measured from the surface of the core-shell heterostructure at the point of connection to the opposing end. This point of connection of the TMD wing to the core-shell heterostructure may be at the interface between the core-shell heterostructure and the underlying substrate. The TMD wings may be characterized by an average angle formed between the plane defined by the substrate surface and the plane defined by the wing. The average angle may be in the range of from 30° to 90°. As noted above, core-shell heterostructures may have a single TMD wing, a few TMD wings, or more. In the case of multiple TMD wings, the TMD wings may extend around the circumference of the core-shell heterostructure. (See FIG. 5C.)

In embodiments, a TMD heterostructure may have both a TMD sheet extending radially from the core-shell heterostructure and one or more TMD wings.

Individual TMD heterostructures and substrates functionalized with the TMD heterostructures are also provided. Their features follow from the description provided above.

The TMD heterostructures and functionalized substrates may be used in a variety of devices and applications. An illustrative device is a field-effect transistor (FET), e.g., wherein the TMD heterostructures form a channel of the FET. (See FIGS. 4A-4C.)

Another illustrative device is an electrocatalytic cell wherein the TMD heterostructures are part of an electrode of the cell. Such electrocatalytic cells may be used to catalyze certain electrochemical reactions, e.g., the hydrogen evolution reaction (HER), in which hydrogen (H$_2$) is produced via the electrolysis of water (H$_2$O). (See Example 2.)

Figure 8:
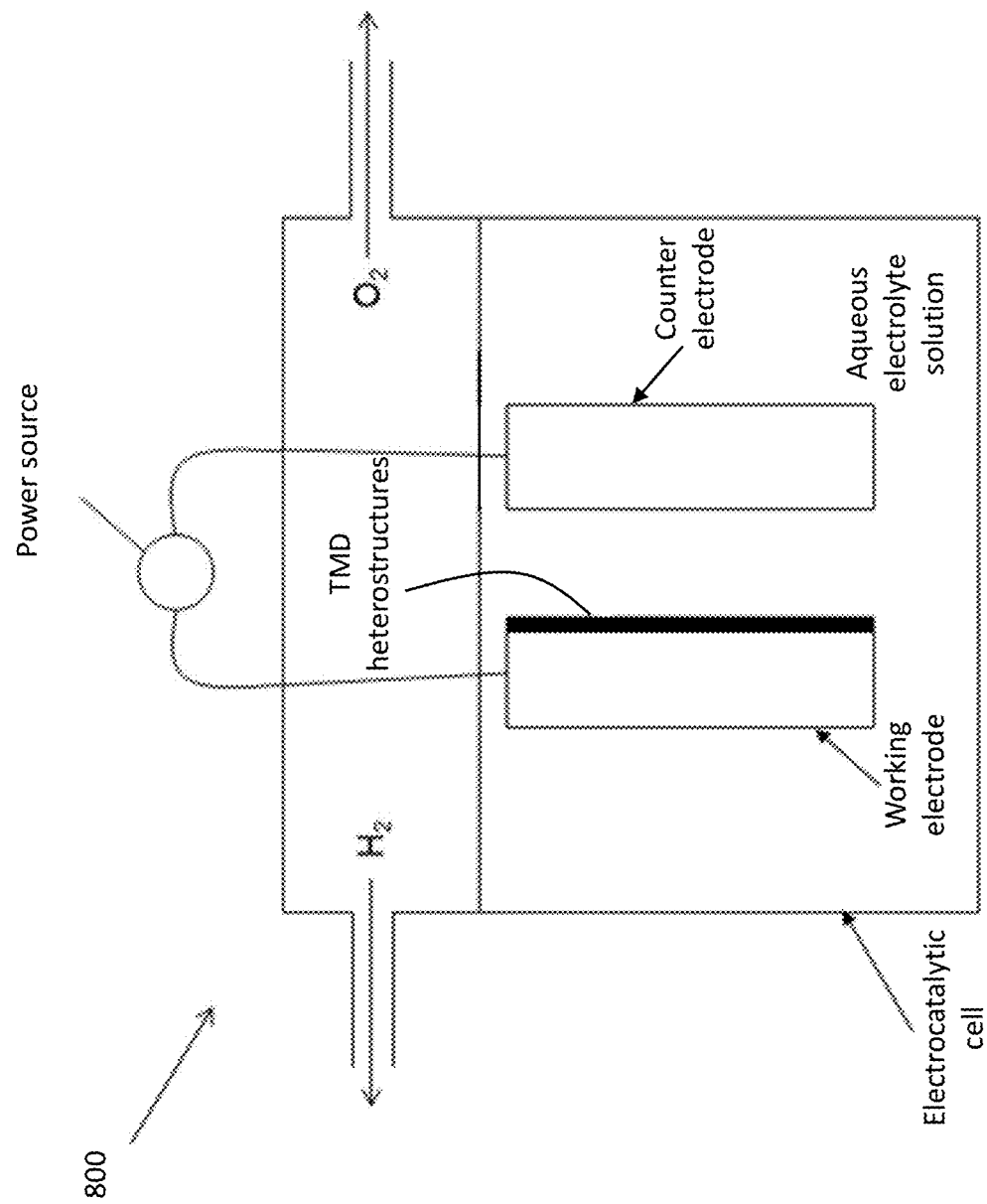
FIG. 8 shows an illustrative electrocatalytic cell configured to carry out the hydrogen evolution reaction (HER) using the present TMD heterostructures to catalyze the reaction.

An illustrative electrocatalytic system 800 is shown in FIG. 8. The system 800 comprises an electrocatalytic cell configured to contain an aqueous electrolyte solution; a working electrode comprising any of the TMD heterostructures described herein in contact with the solution; and a counter electrode. A power source is configured to apply an electrical potential across the working electrode and the counter electrode in order to generate free electrons for electrochemically inducing the reduction reaction at the working electrode, e.g., the HER.

Thus, methods of using the TMD heterostructures and the functionalized substrates are also provided. Such a method may comprise using the TMD heterostructures (or electrodes or electrocatalytic systems comprising the TMD heterostructures) to catalyze an electrochemical reaction such as the HER. In embodiments, the method includes exposing any of the disclosed TMD heterostructures/functionalized substrates to a fluid including an electrochemical reactant. The exposure results in the reduction of the electrochemical reactant (e.g., hydrogen ions) at the TMD heterostructures/functionalized substrate-fluid interface to produce a reduction product (e.g., $H_2$), which may also be separated from the fluid and collected.

As used herein, the term average refers to an average number as determined from a representative number of entities.

EXAMPLES

Example 1

Introduction

In this Example, the possibility to artificially replace the natural seeds in the conventional CVD process with pre-patterned Au nanostructures to achieve selective-area growth of $MoS_2$ monolayers with precisely defined geometries is demonstrated. Moreover, using Density Functional Theory (DFT) calculation provided a much deeper understanding of the seeding mechanism of Au nanoparticles. The field-effect transistors made from $MoS_2$ patterns designed through the seeding method described herein exhibit on/off ratios of ~$10^7$ and carrier mobilities between 6.5-20.7 $cm^2$ $V^{-1}$ $s^{-1}$, which are quite comparable to the values previously reported for monolayer $MoS_2$ devices. This advancement provides an avenue for defining potential device geometries through direct synthesis methodologies.

Experimental

Materials and Methods:

Molybdenum trioxide and Sulfur powders were purchased from Alfa Aesar (Ward Hill, Mass.). A heavily-doped P-type Si wafer with a 300 nm thermally-grown $SiO_2$ surface layer was purchased from UniversityWafer, Inc. (South Boston, Mass.). Lesker Nano38 Thermal Evaporator was used to deposit the Au film on the substrate. CVD and thermal annealing were conducted in a Lindberg Blue M tube furnace. Hitachi SU8030 SEM and JEOL ARM300F GrandARM S/TEM were used for morphological and structural characterizations. Raman spectra and photoluminescence spectra were collected on the HORIBA LabRAM HR Evolution Confocal Raman System with an excitation laser of 532 nm. The electronic measurements were conducted on the Signatone S-1160 probe station equipped with a X-Cite® 110 LED from Excelitas Technologies in ambient conditions.

Au-Seeded Chemical Vapor Deposition of $MoS_2$ Monolayers:

The $Si/SiO_2$ substrates were cleaned with the piranha solution (4:1 $H_2SO_4$:$H_2O_2$) at 110° C. for 30 min before use. To pattern Au nanoparticle arrays on the substrate, a standard electron-beam lithography process was used. Briefly, PMMA (950 A3) film was spin-coated on the $Si/SiO_2$ substrate at 4000 rpm for 45 s, followed by a hard baking at 180° C. for 3 min. The substrate was then exposed by an electron-beam with area dose of 400-600 µC/$cm^2$ using the FEI Quanta 650 ESEM. After developing, an Au film of 25 nm was evaporated on the substrate. This was further followed by lift-off in acetone and high-temperature annealing at 800° C. for 15 min to make spherical nanoparticles. To pattern large-area Au seed arrays on the substrates, a standard photolithography process was used. Briefly, photoresist S1805 was spin-coated on the Si substrate. After a soft baking at 110° C. for 1 min, the substrate was exposed using a UV light for 18 ms using the Heidelberg µPG 501 Maskless Aligner and developed in MF-319 for 30 s. The substrate was then subjected to an oxygen plasma treatment at 50 W for 30 s, followed by deposition of 5 nm Au film through thermal evaporation. Finally, the photoresist was lifted off to obtain Au seed patterns.

The subsequent Au-seeded CVD of $MoS_2$ monolayers was conducted via a modified CVD process. Briefly, the Au nanoparticle-coated substrates were put face down on an alumina boat containing 10 mg $MoO_3$. Another boat containing 120 mg sulfur powders was put in the upstream side. $N_2$ gas with a flow rate of 100 sccm was used as the carrier gas. The furnace was first heated up to 300° C. and kept for 30 min, and then ramped to the growth temperature (650° C.). The growth was continued for 5 min or 10 min with a $N_2$ flow rate of 10 sccm. The furnace was then slowly cooled down to ambient temperature with a 100 sccm $N_2$ flow.

Device Fabrication and Characterizations:

The $MoS_2$ monolayer channels grown in a specific shape on the $Si/SiO_2$ substrate were used to fabricate the field-effect transistors. The device fabrication was conducted using a standard photolithography process. Specifically, photoresist (S1805) was spin-coated on the substrate with a spin rate of 4000 rpm for 30 s. The substrate was soft-baked at 110° C. for 1 min. The pre-designed contact mask was aligned to the device target region. UV light exposure was then conducted for 18 ms. The substrate was then developed in MF-319 for 30 s and further cleaned with oxygen plasma at 50 W for 30 s. Subsequently, a 5-nm Cr film and 50-nm Au film were evaporated onto the substrate to serve as the contact. The sample was then lifted off in hot acetone and finally annealed at 250° C. for 2 h (in $N_2$ environment) before electric characterizations. The transfer characteristics were obtained with 0.5 V applied drain voltage. The dimensions of the various devices were estimated using the optical image as shown in FIG. 4B. The optoelectronic tests were conducted using an illumination power linearly varying from 0.114-0.456 µW.

Density Functional Theory study: Periodic boundary conditions and a plane wave basis set as implemented in the Vienna ab initio simulation package were used. The total energies were numerically converged to approximately 3 meV/cation with a basis set energy cutoff of 500 eV and dense k-meshes corresponding to 4000 per reciprocal atom k-points in the Brillouin zone. The surface energy was calculated as $E_{surf}=(E_{tot,slab}-E_{bulk})/A$, where $E_{tot,slab}$ is the total energy of the slab used to model the surface, $E_{bulk}$ is the corresponding total energy in bulk phase, and A is the surface area. The interfacial formation energy $E_{int}$ is an important quantity that is affected by local chemical bonding and strain effects due to lattice mismatch. To evaluate the relative stabilities of the various interface structures, $E_{int}$ was calculated as $E_{int}=(E_{tot}-E_{slab1}-E_{slab2})/A$, where $E_{tot}$ is the total energy of the interface containing two slabs, $E_{slab1}$ is the total energy of slab 1, $E_{slab2}$ corresponds to the total energy of slab 2, and A is the surface area.

Results and Discussion

In order to demonstrate seeded growth of $MoS_2$ monolayers at different stages of the CVD process, patterned arrays of Au nanoparticles were first deposited on an $Si/SiO_2$ substrate using electron-beam lithography. The initial formation of $MoS_2$ monolayers (grown for 5 min) on the patterned substrate is shown in FIG. 1A. One can observe that each $MoS_2$ flake grows preferentially outward from an individual nanoparticle, which is a clear indication of the seeded $MoS_2$ growth. When the growth time was increased, the initial monolayers merged to form continuous films that, over time, yielded bilayer and multilayer growth as well (FIG. 1B). Similarly, such seeded growth can be extended further to achieve large area patterns through the use of photolithography. In this case, as well, the consistent formation of $MoS_2$ flakes surrounding each Au seed was observed, which was a ~1 μm circular pattern composed of numerous individual nanoparticles. Various patterns were used (data not shown). From these images, it is apparent that while the size and selectivity of flake coverage can be modulated by varying the growth time, the final geometry can be deterministically constructed using the designed seeding patterns.

A continuous $MoS_2$ film surrounding the array of Au seeds was obtained, and Raman spectra and PL spectra (excited with a 532-nm laser) were collected from various spots for comparison (data not shown). Spot 1 was collected from an $MoS_2$ monolayer grown by conventional CVD with no Au seeds. The corresponding Raman spectrum shows the two typical $MoS_2$ vibration modes, $E_{2g}$ and $A_{1g}$. The $E_{2g}$ mode is attributed to the in-plane vibration of Mo and S atoms, while the $A_{1g}$ mode is related to the out-of-plane vibration of S atoms. Meanwhile, the PL spectrum exhibits a center position of 1.80 eV, corresponding to the A exciton energy. The positions and intensity of Raman and PL spectra from the seeded $MoS_2$ (spot 2) are generally consistent with that from spot 1, indicating similar crystallinity and material quality. The Raman spectrum collected from the location of Au seeds (spot 3), however, shows an increased $E_{2g}$-to-$A_{1g}$ frequency difference as well as an increased intensity; meanwhile, its PL spectrum also shows a significantly decreased intensity. This can be explained by the presence of a multilayer $MoS_2$ structure on/near the Au seeds.

To understand the fundamental seeding mechanism, the synthesized material was sealed inside an epoxy matrix to fabricate the cross-section TEM samples (data not shown) for revealing the nature of the Au nanoparticle seeds after $MoS_2$ growth. As shown in FIG. 2A, the individual Au nanoparticle was entirely encapsulated by a few-layer $MoS_2$ shell and displayed a core-shell structure, which corroborates nicely with the Raman and PL spectra observed. High-resolution TEM images in FIGS. 2B and 2C further show that the $MoS_2$ layers bifurcated at the interface of the Au nanoparticle and $SiO_2$ substrate to form the planar $MoS_2$ sheet and $MoS_2$ shell. The variation of atomic structure at various locations in FIG. 2C was examined (data not shown). One can observe that the crystal structure of the Au nanoparticles (location 1) exhibits a typical (111) low-energy plane, with an ABA stacking sequence. At the interface region of Au and $MoS_2$ (location 2), the Au phase maintains the same crystal structure; however, slight lattice distortion and interstitial atoms were detected, likely due to interaction across the interface with $MoS_2$. In location 3, it was observed that the planar $MoS_2$ sheet originates from the shell at the contact surface of Au and the $SiO_2$ substrate. In this location, new $MoS_2$ layers were also found to form at the bifurcated interface of $MoS_2$ shell and the planar sheet. In addition, more cross-section images of the Au seeds after $MoS_2$ growth were obtained (data not shown) and demonstrate similar features. Images display the formation of few-layer $MoS_2$ and the formation of multilayer $MoS_2$ structures with increased growth time. Finally, EDS maps were also obtained (data not shown) and confirm the spatial distribution of Au, Mo, and S throughout the Au@$MoS_2$ core-shell architecture.

From the TEM results, one can surmise that the growth of planar $MoS_2$ monolayers potentially originates from the favorable formation of $MoS_2$ shell structures on the Au nanoparticles. Thus, understanding the initial growth process on the Au seeds is of great importance. One possible mechanism would initially involve preferential deposition of $MoS_2$ layers on the surface of Au nanoparticles or at the exposed interface of Au—$SiO_2$, thereby following a classic heterogeneous nucleation process. These layers may then grow up along the Au surface and Au—$SiO_2$ interface via atomic diffusion, and finally form an entirely-encapsulated $MoS_2$ shell. To investigate the thermodynamic driving force for this $MoS_2$ nucleation process, DFT calculations were conducted to reveal the variations of surface energy (the energy required to form a surface, i.e., interface with vacuum, from the bulk phase) and interface energy (the energy required to form an interface from two separate phases) among the Au—$SiO_2$, Au—$MoS_2$, and $SiO_2$—$MoS_2$ interfaces.

Figure 3A:
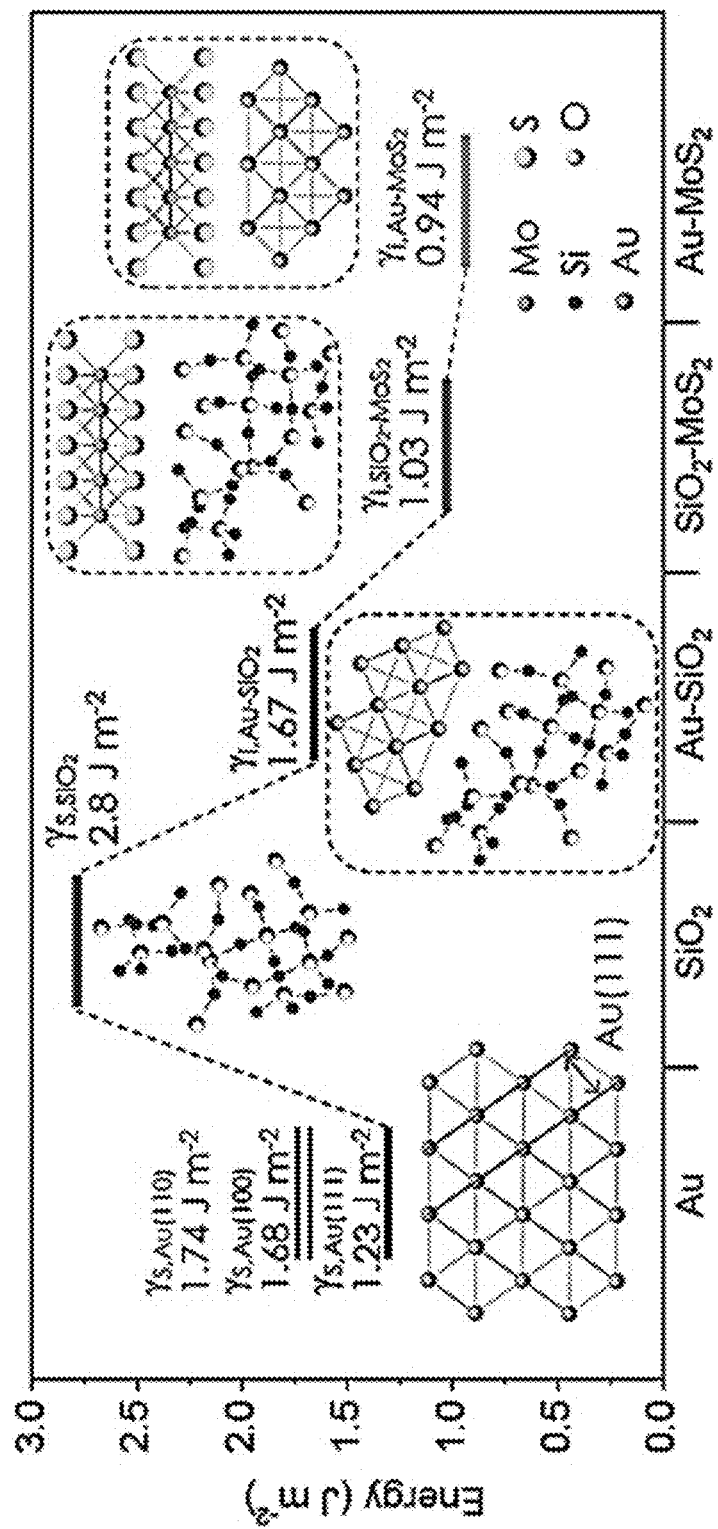
FIGS. 3A-3D illustrate the seeding mechanism.

As shown in FIG. 3A, the surface energy of the Au phase varies depending on the lattice plane, and the (111) plane shows the lowest energy. The thermally-produced $SiO_2$ substrate has an amorphous structure and exhibits an overall surface energy of 2.8 J m$^{-2}$. When the Au and $SiO_2$ form an interface, an interface energy of 1.67 J m$^{-2}$ is calculated, which is larger than the low-energy Au phase but smaller than the surface energy of $SiO_2$. The interfacing of $SiO_2$ with $MoS_2$ leads to further decreases in interface energy (1.03 J m$^2$), while the Au (111)-$MoS_2$ interface has the smallest formation energy (0.94 J m$^{-2}$). These theoretical interface energy values reveal that the deposition of $MoS_2$ on $SiO_2$ is a thermodynamically favorable process. Meanwhile, the deposition of $MoS_2$ on the Au phase is even more favorable, which further supports the proposed seeding mechanism, suggesting that Au can serve as a preferential heterogeneous nucleation site. Further, these calculations suggest that the Au seed surface, i.e., the (111) plane, and the exposed interface between Au and $SiO_2$ potentially act as the most active sites for the initial nucleation of $MoS_2$, which induces subsequent shell and lateral layer formation.

Figure 3B:
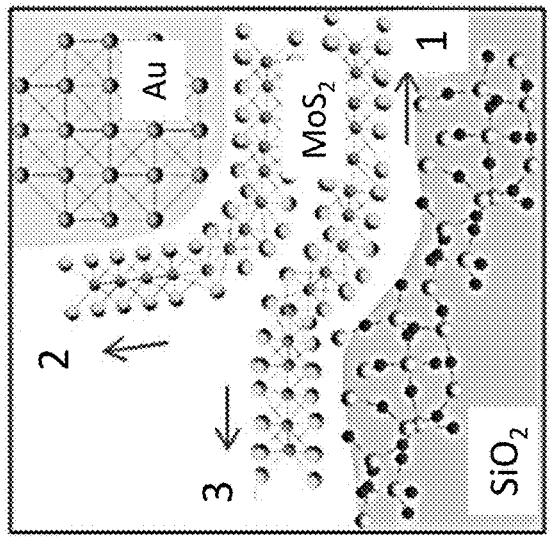
Figure 3C:
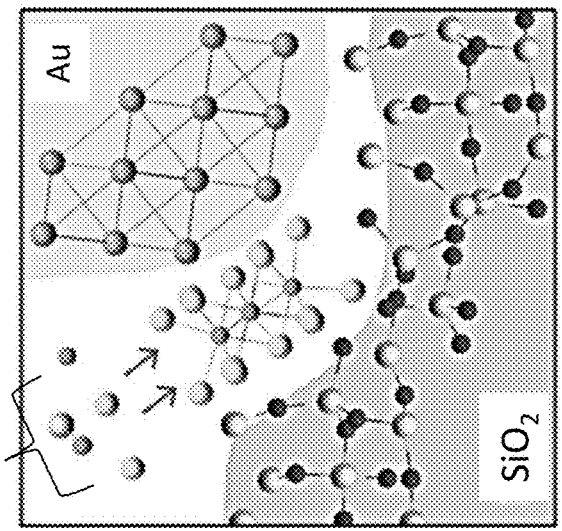
Figure 3D:
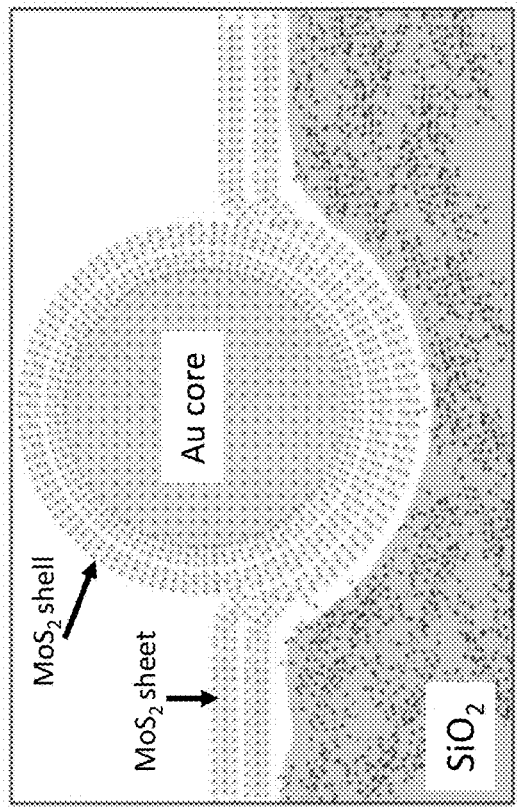

Based on the calculations, the most likely growth mechanism process is schematically shown in FIGS. 3B-3D. With the supply of Mo and S precursor atoms, a $MoS_2$ nucleus preferentially forms at the outer interface of Au and $SiO_2$ (FIG. 3B). After that, the $MoS_2$ layer can potentially grow along three directions (FIG. 3C): (1) at the Au—$MoS_2$ interface by boundary diffusion of Mo and S atoms; (2) on the surface of the Au nanoparticle to form an encapsulated shell structure; and (3) along the $SiO_2$ substrate to form the lateral sheet. It is worth noting that lateral growth, rather than the formation of vertical islands, is preferred due to the more favorable thermodynamic driving force in the in-plane direction. The final structure, where an Au@$MoS_2$ core-shell induces the formation of lateral $MoS_2$ sheets, is shown in FIG. 3D. Such an Au-seeded CVD pathway is further supported by additional TEM observations (data not shown), which suggest no presence of Mo and S atoms inside the Au nanoparticles. This suggests that despite the high-temperature growth process, no significant chemical reaction between Au and Mo/S occurs, and the formation of $MoS_2$ layers between the Au—$SiO_2$ interface is most likely to be accomplished by interface diffusion. Meanwhile, it was also found that on a few Au nanoparticles, the $MoS_2$ shell only partially encapsulates the Au nanoparticles, leaving bottom regions bare (data not shown). The discontinuous shell is probably a result of insufficient diffusion during the growth, which further evidences the growth mechanism provided above.

The discovery of this metal-seeding effect allows for wide design freedom in construction of various integrated circuits and transistors without the need for etching. FIG. 4A shows a representative example for designing a $MoS_2$ channel with a "∫" shape for a typical field-effect transistor (FET)

enabled by patterning of Au seeds. The obtained channel geometry is shown in FIG. 4B, outlined with dotted lines. Other dotted lines indicate the area where Au electrodes were fabricated for patterned arrays of multiple FET devices. An AFM image (data not shown) collected from $MoS_2$ flakes in the device pattern indicates a monolayer thickness of ~6.5 Å. The thickness difference of $MoS_2$ on the $SiO_2$ substrate compared to the Au nanoparticle seeds is likely due to the difference in $MoS_2$ growth rate between the two media. It is also worth noting that the formation of few-layered $MoS_2$ nanosheets is also observed with the increased growth time. The corresponding Raman and PL maps (data not shown) further confirm that the obtained $MoS_2$ monolayers are overall uniform in thickness and quality, with the presence of few-layer structures only at the center spots where the seeds are present (indicated by the bright spots in the Raman map and dark spots in the PL map).

The representative transfer characteristics ($I_d$-$V_g$) were examined. The increase in current with positive gate voltage in the transfer curves is indicative of typical n-type channel behavior, which is consistent with the n-type nature of monolayer $MoS_2$. The hysteretic nature of these curves can be attributed to the possible charge trapping that originated from the adhesion of adsorbate atoms on the surface of the channel or the absorption of oxygen molecules, moisture, etc. in ambient conditions. From the evaluation of multiple devices, a field-effect mobility of 6.5-20.7 $cm^2$ $V^{-1}$ $s^{-1}$ and an on/off ratio of ~$10^7$ were estimated, which compare favorably to the values reported for monolayer $MoS_2$ transistors. This indicates that the impact of potential carrier scattering from the Au seeds and the resultant grain boundaries on the electronic properties of the device is not significant. Moreover, the photoresponse of the $MoS_2$ transistor was further tested to evaluate its utility as a photodetector. As seen in the output curves ($I_d$-$V_d$) (data not shown), the photocurrent constantly increased with increasing drain and gate voltages. The dependence of photocurrent generation on the back-gate voltage was examined (data not shown). The drain current significantly increased for all the values of gate voltage under illumination with a slight dependence on the incident power. These observations indicate that the photocurrent dominates over thermionic and tunneling currents in the entire operating range of the device. The device demonstrates a photoresponsivity of 1.23 A/W, clearly demonstrating the feasibility and compatibility of this newly developed metal-seeding approach for design and fabrication of high-quality electronic $MoS_2$ monolayers.

Conclusions

In summary, the ability to engineer the CVD growth of $MoS_2$ monolayers through the use of Au seeds as heterogeneous nucleation sites was demonstrated. This enables direct growth and fabrication of various integrated circuits and transistors with the desired geometries without the need for etching or invasive manipulation. The fundamental mechanism of the Au-seeded CVD growth involves the formation of an initial few-layer $MoS_2$ shell on the Au nanoparticles, and subsequent induced growth of planar $MoS_2$ on the $SiO_2$ substrate. $MoS_2$ field-effect devices with a pre-designed channel geometry enabled by this Au-seeded growth exhibit a mobility of 6.5-20.7 $cm^2$ $V^{-1}$ $s^{-1}$ and an on/off ratio of ~$10^7$. Additionally, the device shows a photoresponsivity of 1.23 A/W. These (opto-)electronic metrics compare nicely with previously reported monolayer $MoS_2$ devices. This Example illustrates a methodology for patterned growth and design of new 2D geometries within the TMD family for future electronic devices.

Data and information indicated as not being shown may be found in U.S. Application No. 62/795,967, which is hereby incorporated by reference in its entirety.

Example 2

Introduction

In this Example, a novel concept is introduced that utilizes the seeding effect of metal nanoparticles to control and modulate the morphology of vertically-aligned few-layer $MoS_2$ wings. This Example contributes new insights into the metal-seeding principle and reports its successful application in the growth of free-standing $MoS_2$ wings surrounding the Au nanostructures, namely winged Au@$MoS_2$ (w-Au@$MoS_2$) heterostructures. The $MoS_2$ wings provide an abundance of edge-terminated active sites for the hydrogen evolution reaction, while simultaneously providing low resistance electron transport pathways mediated through the Au nanoparticle cores. Significantly improved catalytic performance was observed on these winged heterostructures with a hydrogen-evolution overpotential approaching ~120 mV. This Example demonstrates a new 2D morphological engineering approach for future electrochemical energy applications.

Experimental

Materials and Methods

Molybdenum trioxide and Sulfur powders were purchased from Alfa Aesar (ward Hill, Mass.). The heavily-doped P-type Si wafer was purchased from UniversityWafer, Inc. (South Boston, Mass.). The HOPG was purchased from SPI Supplies (West Chester, Pa.). The HENCO 1+1 A-B glue was purchased from HENCO-GLUE Inc. (Taizhou, China). Buffered oxide etch (BOE) was self-prepared by mixing 40% $NH_4F$ and 49% HF with a volume rate of 6:1. The Lesker Nano38 Thermal Evaporator was used to deposition Au film on the Si and HOPG substrate. CVD and thermal annealing were conducted in a Lindberg Blue M tube furnace. Hitachi SU8030 SEM and JEOL JEM-2100 Fas TEM were used for morphological and structural characterizations. Raman spectra and photoluminescence spectra were collected on the HORIBA LabRAM HR Evolution Confocal Raman System. X-ray photoelectron spectroscopy (XPS, Thermo Scientific ESCALAB 250Xi) was used for binding energy analysis. Electrochemical tests were conducted on the 750E Bipotentiostat from CH Instruments, Inc. (Austin, Tex.). The Electrochemical Impedance Spectroscopy (EIS) Data Analysis was conducted using the ZSimpWin software.

Chemical Vapor Deposition of Au@$MoS_2$ and w-Au@$MoS_2$ Heterostructures

The heavily-doped Si substrate was cleaned with the BOE solution for 15 s to remove the surface oxide layer before use. This was followed by evaporation of 5-nm Au film and annealing at 800° C. for 15 min in air to form Au nanoparticles on the substrate. The sample was then sent for CVD processing. Briefly, the Au nanoparticle-coated substrate was put face down on an alumina boat containing $MoO_3$. Another boat containing sulfur powders was put in the upstream side. $N_2$ gas with a flow rate of 100 sccm was used as the carrier gas. The furnace was first heated up to 300° C. and kept for 30 min, and then ramped to the growth temperature (650° C.). For the formation of Au@$MoS_2$ with lateral $MoS_2$ monolayers, 10 mg of $MoO_3$ and 120 mg of sulfur powders were used; the growth was conducted for 5 min. For the synthesis of w-Au@$MoS_2$ with free-standing $MoS_2$ wings, 45 mg of $MoO_3$, and 500 mg of sulfur powders were used; the growth was continued for either 10 min or 30 min. During the growth process, the $N_2$ flow rate was switched to 20 sccm (for Au@MoS$_2$) or 10 sccm (for w-Au@MoS$_2$). When the growth was completed, the furnace was then slowly cooled down to ambient temperature.

To grow the Au@MoS$_2$ and w-Au@MoS$_2$ on the HOPG substrate, similar approaches were used. Briefly, 5-nm Au film was deposited on the HOPG substrate and annealed at 800° C. for 15 min (for the formation of Au nanoparticle seeds) or with no pre-annealing process (for the growth of island-like w-Au@MoS$_2$ samples; the Au islands formed during the CVD process), with a constant flow of 100 sccm $N_2$ gas. The substrates were then sent for CVD deposition, which was conducted exactly the same as the process for the growth on the Si substrate.

Electrochemical Hydrogen Production

The hydrogen evolution test was conducted on the as-produced w-Au@MoS$_2$ heterostructures (and Au@MoS$_2$), both on the Si substrate and HOPG substrate. These substrates were well-sealed using A-B glue so only the front side was exposed to the electrolyte. The water splitting was conducted in 0.5 M $H_2SO_4$ solution at room temperature. 1000 ml of the electrolyte was used each time to keep a minimum $H_2SO_4$ concentration change during the electrolysis. A typical three-electrode system was used. A 3.5 M KCl Ag/AgCl electrode was used as the reference electrode; a Pt wire was used as the counter electrode; and the Au@MoS$_2$ or w-Au@MoS$_2$ coated Si or HOPG substrate (sealed) was used as the working electrode (cathode) for the hydrogen production. All potentials were converted against the standard hydrogen electrode (SHE). The characterization of the Pt electrode was conducted using a Pt disk with diameter of 1.6 mm. The linear sweep voltammetry (LSV) was conducted from −0.8 V to 0.1 V with a scan rate of 5 mV s$^{-1}$. All the LSV curves were displayed without IR-correction. The LSV curve was further used to obtain the Tafel plots. EIS was performed over a frequency range of 100 kHz to 5 mHz at an amplitude of 5 mV at −0.3 V (on HOPG substrate) and −1.0 V (on Si substrate).

Density Functional Theory Details

Periodic boundary conditions were used and a plane wave basis was set as implemented in the Vienna ab initio simulation package. The total energies were numerically converged to approximately 3 meV/cation with a basis set energy cutoff of 500 eV and dense k-meshes corresponding to 4000 per reciprocal atom k-points in the Brillouin zone. The binding energy was calculated by $E_b(H)=E_{tot}(H)-E_{tot}(slab)-0.5E_{tot}(H_2)$, where $E_{tot}(H)$, $E_{tot}(slab)$, and $E_{tot}(H_2)$ are, respectively: total energy of the host material with H adsorbed at different sites, total energy of the pure MoS$_2$ slab, and total energy of molecular $H_2$. The association barriers from two H atoms to a $H_2$ molecule are calculated by nudged elastic band methods using 8 images.

Results and Discussion

Structural Evolution of Winged Au@MoS$_2$ Heterostructures

The CVD nucleation and growth process can be exploited to induce preferential growth and gain morphological control. As described in Example 1, above, this Example uses Au nanoparticles to serve as heterogeneous nucleation sites for MoS$_2$ growth. Subsequent growth leads to the formation of Au@MoS$_2$ core-shell heterostructures with laterally-grown MoS$_2$ monolayers spreading from the nanoparticles. The Au seeds were first patterned on the Si substrate. The constant formation of lateral MoS$_2$ nanosheets from individual nanoparticles and the relatively-larger Au clusters with a predesigned geometry were observed, clearly demonstrating a so-called seeding effect. Such seeding phenomenon can be explained by the natural affinity of gold and sulfur atoms, which leads to the initial formation of MoS$_2$ shells on the Au nanoparticles. These MoS$_2$ shell-encapsulated Au nanoparticles (Au@MoS$_2$) serve as the nuclei and induce the subsequent lateral growth of MoS$_2$ layers.

Figure 5F:
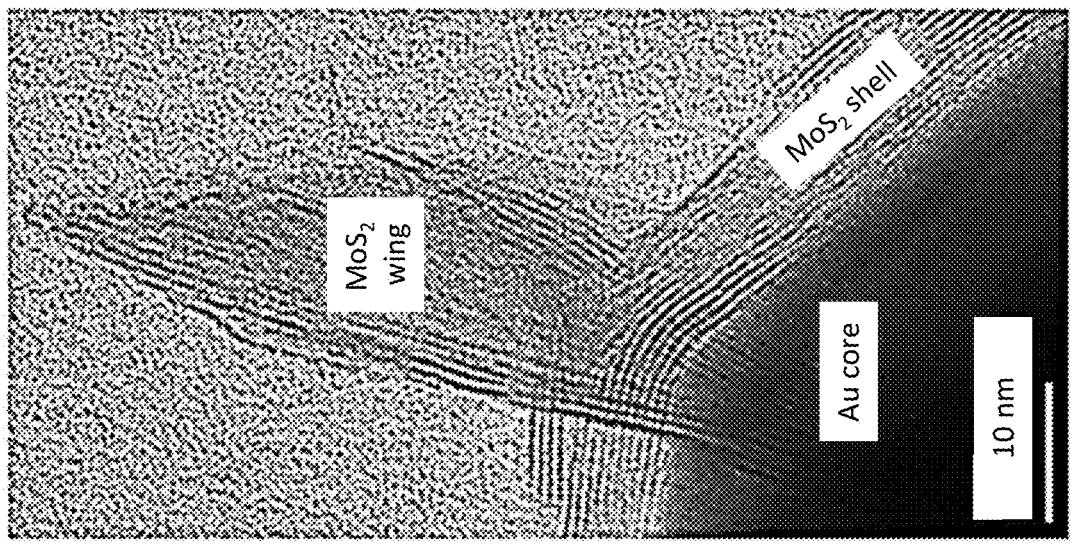
Figure 5D:
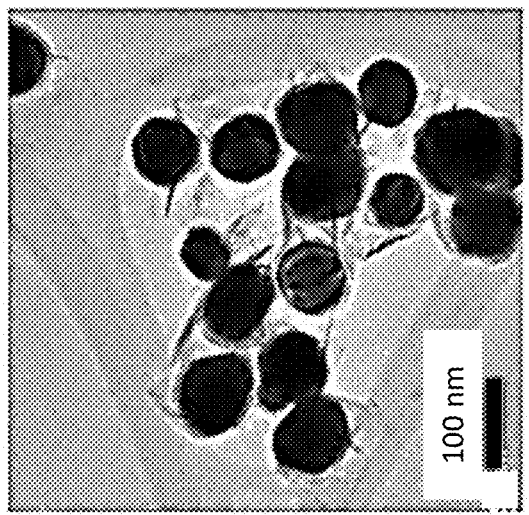
Figure 5E:
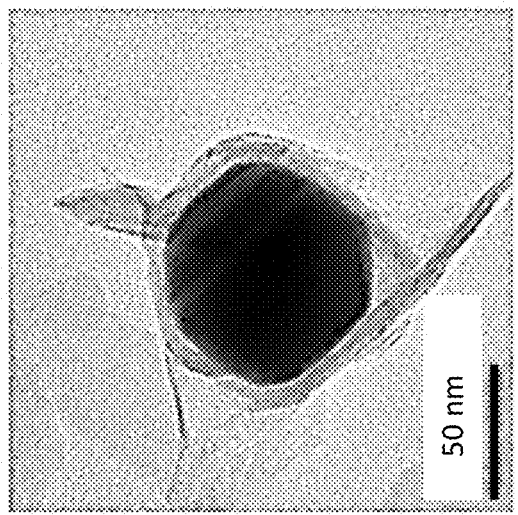

More interestingly, the morphology of MoS$_2$ structures surrounding the Au nanoparticles can be effectively modulated by controlling the CVD conditions. The evolution of free-standing MoS$_2$ wings on the Au@MoS$_2$ heterostructures can be successfully achieved by increasing the vapor pressure of sulfur in the growth chamber. Here, the unique curved geometry in the Au@MoS$_2$ system leads to an abundance of strained and/or defect sites. Moreover, free-standing MoS$_2$ wings on spherical Au nanoparticles are more favorable compared to a flat substrate from an HER perspective. Micrographs of the resultant winged Au@MoS$_2$ (w-Au@MoS$_2$) heterostructures are shown in FIGS. 5A-5F. In this growth process, the MoS$_2$ wings are consistently observed on each individual Au@MoS$_2$ heterostructure and exhibit a similar morphology (FIGS. 5A, 5B). With increasing growth time, the products form a flower-like structure surrounding the Au@MoS$_2$ core (FIG. 5C). Additional SEM images were obtained (data not shown). EDS maps were also obtained (data not shown) and confirm the presence of elemental Au, Mo, and S. TEM was used to probe the morphology and atomic structure, further confirming the presence of free-standing few-layer MoS$_2$ wings on each heterostructure (FIGS. 5D-5F). High-resolution TEM images (data not shown) indicate a layer-to-layer spacing of ~0.65 nm for the wings and a typical hexagonal in-plane atomic structure of MoS$_2$. The corresponding diffraction pattern (data not shown) also indicates the presence of dominant facets: Au (111), MoS$_2$ (100), and MoS$_2$ (110).

Figure 6A:
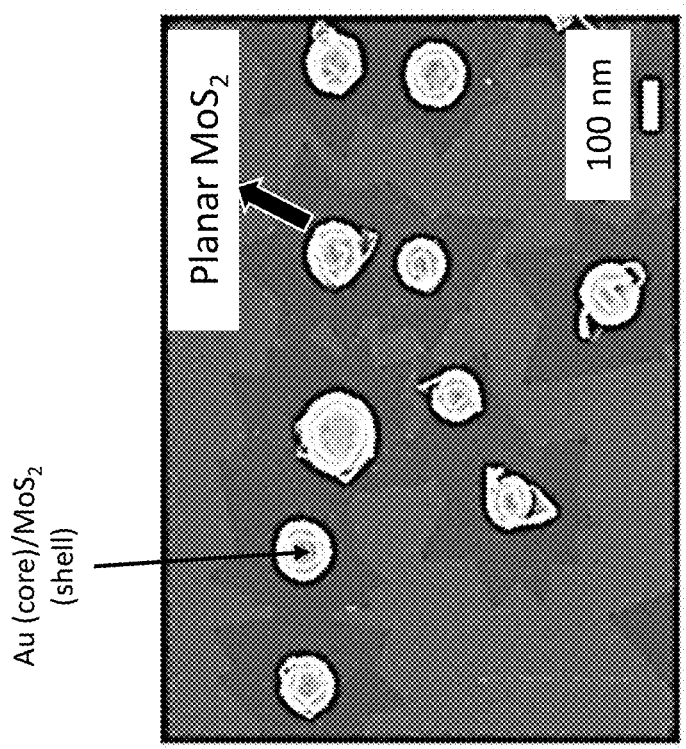
FIGS. 6A-6D show morphological engineering on a highly-ordered pyrolytic graphite (HOPG) substrate.
Figure 6B:
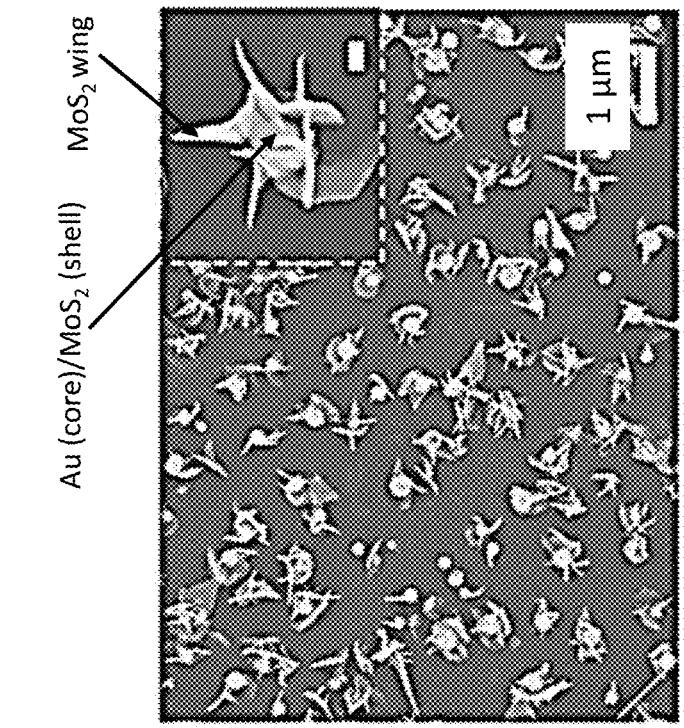
Figure 6D:
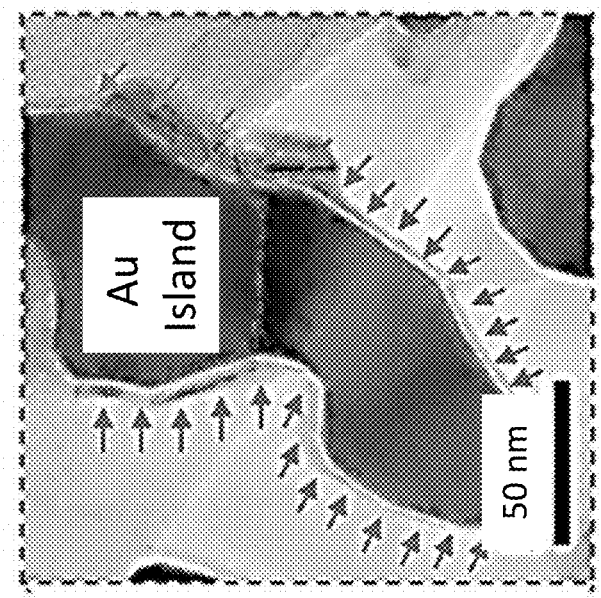
Figure 6C:
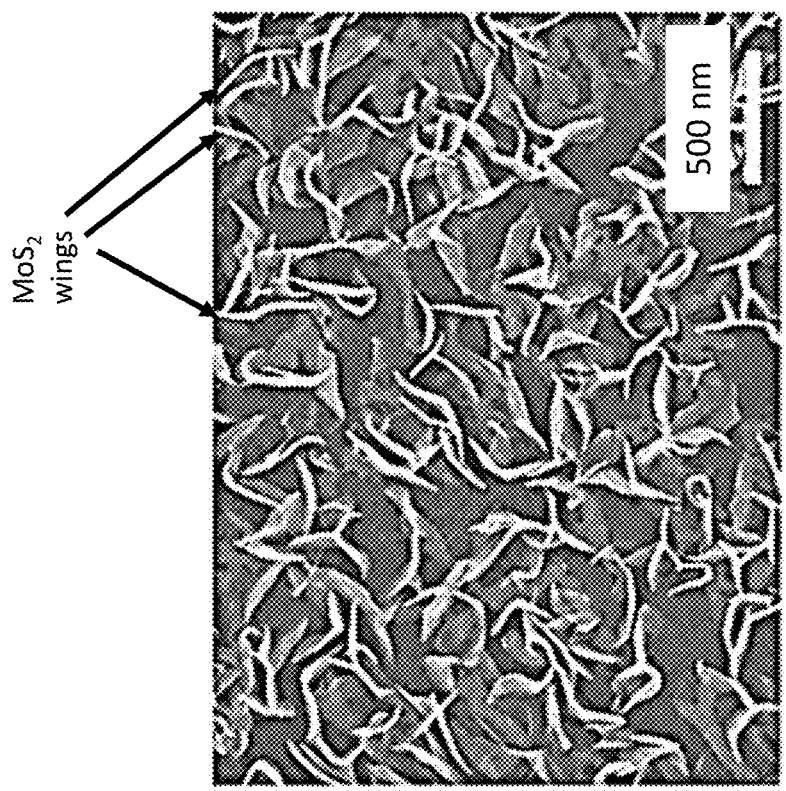

The CVD growth process was further extended to a HOPG substrate for the purpose of performing electrochemical hydrogen evolution. It is first worth noting that when utilizing the conditions of growing lateral MoS$_2$ monolayers, the same seeding effects were observed on HOPG as on the Si substrates, where the planar MoS$_2$ flakes were consistently formed at each Au nanoparticle site (FIG. 6A). The w-Au@MoS$_2$ heterostructures were obtained by increasing the sulfur vapor pressure as described above. As shown in FIG. 6B, free-standing MoS$_2$ wings were consistently formed on each Au nanoparticle, and the inset in FIG. 6B shows a representative individual w-Au@MoS$_2$ heterostructure. Besides the growth on the Au nanoparticles, it was further realized that the MoS$_2$ wings can be grown on island-like Au seeds (FIG. 6C). Due to this morphological flexibility in placement of Au seeds, the density of MoS$_2$ wings on the HOPG substrate can be accordingly modulated by effectively varying the growth time (additional data not shown). From high-resolution images (data not shown), it is clearly observed that each individual MoS$_2$ wing is preferentially grown from the Au island, as opposed to the HOPG substrate.

A low magnification TEM image of the island-seeded w-Au@MoS$_2$ heterostructures was obtained (not shown). The enlarged image is shown in FIG. 6D and confirms that the entire Au island seed is encapsulated in the few-layer MoS$_2$ shell. Moreover, individual w-Au@MoS$_2$ heterostructures were examined, and one can clearly observe the formation of MoS$_2$ wings from each Au seed. High-resolution images (data not shown) further demonstrate the multilayered structure of the MoS$_2$ shell on the Au island as well as the typical few-layered nature of the MoS$_2$ wings, with a typical hexagonal in-plane atomic structure consistent with the 2-H MoS$_2$ for the latter. The basic atomic structure of an individual MoS$_2$ wing is expected to be few-layered MoS$_2$ flakes free-standing on the Au@MoS$_2$ islands and typically terminates with the preferential zigzag or armchair edges.

Spectroscopic characterizations were conducted for the w-Au@MoS$_2$ heterostructures grown on both HOPG and Si substrates, indicating very similar composition and elemental states of the products from different substrates (data not shown). Raman spectroscopy of the Au@MoS$_2$ and w-Au@MoS$_2$ heterostructures indicates the presence of the two typical vibration modes, $E^1_{2g}$ and $A_{1g}$. The $E^1_{2g}$ mode is attributed to the in-plane vibration of Mo and S atoms, while the $A_{1g}$ mode is related to the out-of-plane vibration of S atoms. For the Au@MoS$_2$ heterostructures, the two vibration modes are centered at 380.7 cm$^{-1}$ and 405.6 cm$^{-1}$, respectively, while those of the w-Au@MoS$_2$ are slightly red-shifted by ~3.6 cm$^{-1}$, which is indicative of reduced strain in the winged heterostructures. In addition, in both materials, the $E_{2g}$-to-$A_{1g}$ frequency difference (ca. 24.7 cm$^{-1}$) remains constant. This value is slightly smaller than that of bulk MoS$_2$, indicating the multi/few-layered nature of MoS$_2$ shells and wings. XPS spectra of the heterostructures indicate the presence of the expected S, Mo, and Au peaks. The S 2p peak can be deconvolved into two peaks at 163.9 eV and 162.7 eV, corresponding to the $2p_{1/2}$ and $2p_{3/2}$ orbitals. A slight broadening of both 2p peaks was observed for the w-Au@MoS$_2$ heterostructures, with the emergence of two new additional peaks at high binding energy after the deconvolution. This is likely due to the presence of different S valence states originating from the edge-terminated MoS$_2$ wings. The Mo 3d peaks at 233.04 eV and 229.87 eV correspond to $3d_{5/2}$ and $3d_{3/2}$ doublet, confirming the expected Mo$^{4+}$ and S$^{2-}$ states in MoS$_2$. In addition, Au $4f_{5/2}$ and $4f_{7/2}$ peaks were observed at 88.00 eV and 84.29 eV, respectively, as well as the C is peak around 284.6 eV for the sample grown on HOPG.

Electrocatalytic Hydrogen Evolution Reaction

Figures 7A, 7B:
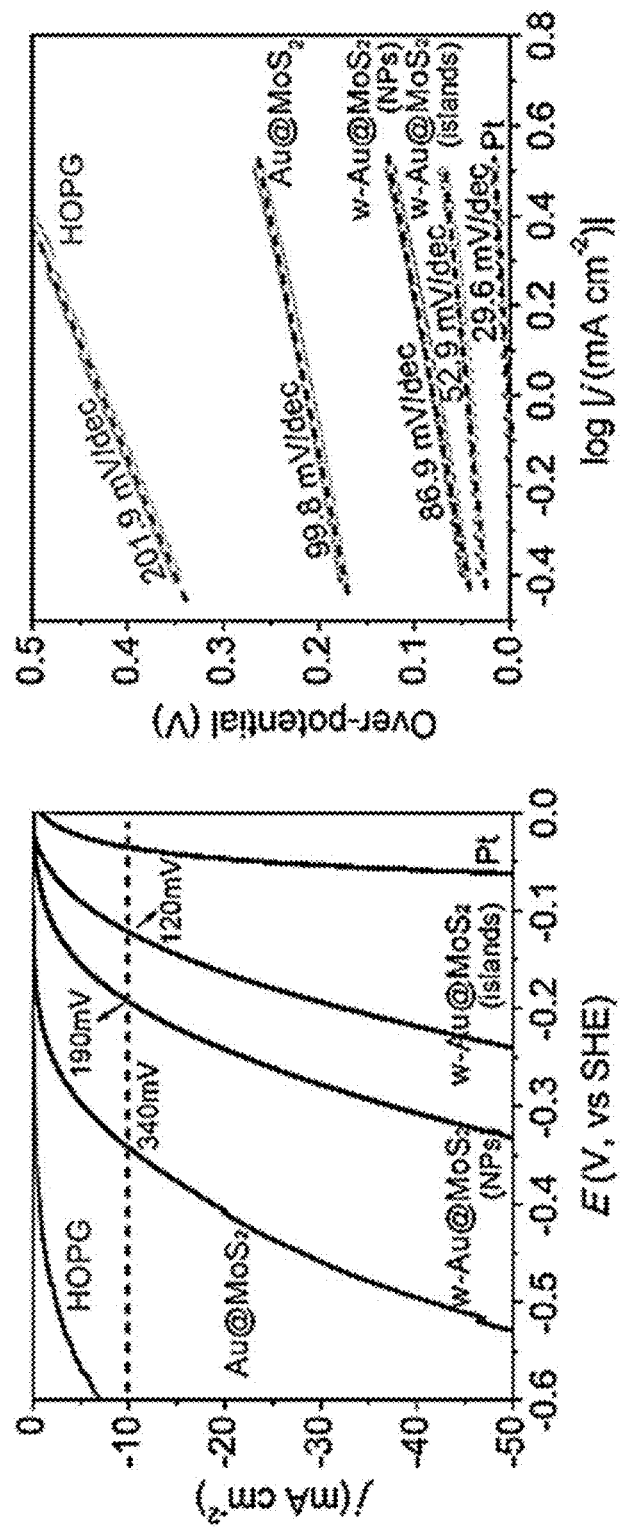
FIGS. 7A and 7B show HER performance of the w-Au@MoS$_2$.

Electrochemical hydrogen evolution experiments were conducted on both the Si-supported and HOPG-supported w-Au@MoS$_2$ structures. The electrodes were properly sealed to only expose the front side to the electrolyte. The w-Au@MoS$_2$ grown on Si substrates yielded a remarkable increase of electrocatalytic activity as compared with the Au nanoparticles and Au@MoS$_2$ on the same substrate (data not shown). However, the HER performance was moderate likely due to the low conductivity of the Si substrate. The samples on the HOPG substrates showed significantly improved HER activity. As shown in FIG. 7A, the w-Au@MoS$_2$ electrodes exhibited impressive and consistently higher activity when compared with the Au@MoS$_2$ electrode. Meanwhile, the island-seeded w-Au@MoS$_2$ sample with a moderate wing density showed the best catalytic performance. The corresponding Tafel plots are shown in FIG. 7B. The w-Au@MoS$_2$ heterostructures showed decreased Tafel slopes (59.6±6.4 mV dec$^{-1}$ from multiple repeating samples).

Comparison of hydrogen evolution overpotential and Tafel slopes of various recently reported MoS$_2$ catalysts with the w-Au@MoS$_2$ heterostructures (data not shown) indicates that pristine or commercial MoS$_2$ catalysts exhibit moderate HER activity; metallic 1T-MoS$_2$ exhibits a significantly decreased overpotential and Tafel slope; while materials formed using defect engineering methods show a further decreased overpotential, albeit with larger Tafel slopes. One recent method for increasing HER performance involves forming composites of MoS$_2$ and Au, while the studies on the structural engineering of MoS$_2$ are perhaps the most promising approach to realize the best HER performance with MoS$_2$-based structures. Compared with these materials, the island-seeded w-Au@MoS$_2$ heterostructures exhibit an overpotential of 141.9±20.5 mV, including a minimum overpotential as low as ~120 mV with favorable Tafel slopes. To date, this is likely one of the lowest overpotential values achieved on pristine MoS$_2$ structures, which exhibit greater crystalline quality and chemical stability compared to chemically-exfoliated or defect-engineered materials. When using a constant cathodic potential, a steady cell current was observed during hydrogen evolution of a 10 h reaction window (data not shown). The polarization curves before and after the 10 h electrolysis show insignificant difference, indicating that the integrity of the electrode was maintained over the course of the experiment. This is confirmed by the TEM images of the sample after electrolysis, which, despite the presence of slight contamination and atomic distortion, generally retains a comparable crystal lattice to the pristine structure (data not shown).

To comprehensively understand the impact of this morphological engineering strategy on the HER activity of MoS$_2$ structures, DFT calculations were conducted to examine the thermodynamic driving force for the hydrogen generation process. Considering the morphological differences between the MoS$_2$ catalysts obtained via seeded growth in this Example, the Gibbs free energy of hydrogen adsorption ($\Delta G°_H$) was modeled, which has proven to serve as an important indicator of HER activity, for various catalyst geometries including (1) a flat MoS$_2$ basal plane, which represents the MoS$_2$ sheet wing surface, (2) a curved basal plane, which represents the MoS$_2$ shell on Au nanoparticles and islands, (3) zigzag edges and (4) armchair edges (wing edges). The $\Delta G°_H$ was calculated as function of monolayer (ML) coverage of hydrogen atoms. In general, a material with $\Delta G°_H$ close to zero is usually the most favorable for HER since very negative $\Delta G°_H$ will lead to slow release of hydrogen molecules from the catalyst surface, whereas the protons will be hard to absorb onto the catalyst when the $\Delta G°_H$ is too positive.

There is a variation of $\Delta G°_H$ of hydrogen adsorption on different MoS$_2$ planes and edges. The flat basal plane of MoS$_2$ exhibited a $\Delta G°_H$ of 1.2-2.0 eV depending on the hydrogen coverage. The curved basal plane (with a curvature of 0.0338 m$^{-1}$ corresponding to a shell encapsulating a 50 nm spherical nanoparticle) led to increased activity since the $\Delta G°_H$ decreased. This is likely due to the presence of strain and lattice distortion in the MoS$_2$ shell structures. The $\Delta G°_H$ on the edge sites of MoS$_2$ wings approached zero when the hydrogen coverage increased to 50%, indicating significantly increased HER activity compared to the basal plane. This further confirms the importance of the experimental strategy of producing high-density MoS$_2$ wing-like structures by using the unique discovery of the metal-seeding method. Besides, it is worth noting that for the first time, the calculation reveals that the zigzag edge sites have a slight positive $\Delta G°_H$, which is favorable for hydrogen adsorption, while the armchair edges sites are favorable for hydrogen desorption due to their negative $\Delta G°_H$. The co-existence of both type of active sites might further improve the overall activity of MoS$_2$ wings by involving an inter-lattice charge transfer process.

To gain more insight into the HER mechanism, the combination of two adsorbed hydrogen atoms was calculated via a typical Tafel step in HER on the zigzag edge sites of MoS$_2$ wing. It was found that weakly absorbed hydrogen atoms (0.23 eV) form the product (H$_2$ molecules) by crossing a transition state (TS) with H—H distance of 1.16 Å. The calculated activation barrier energy is 0.21 eV, and the free energy drops to −2.8 eV in the final state, which indicates a highly favorable driving force for hydrogen formation. In addition, it is worth mentioning that the activation barrier and overall driving force for this Tafel step of $H_2$ formation is very similar for all structures (1-4) modeled above, indicating the overall HER activity (the control step) is dominantly determined by the hydrogen adsorption/desorption process, rather than the charge transfer step.

To corroborate the theoretical results with the experimental data, EIS studies were further conducted using the same HER electrodes. The obtained impedance spectra are not shown here, but all the impedance spectra show one capacitive arc in the high-frequency region and two capacitive arcs in the low-frequency region. The former corresponds to impedance arising from the electrode barrier layer, while the latter is probably associated with the electrocatalytic hydrogen evolution processes such as (a) adsorption of proton on catalysts, (b) charge-transfer Tafel step reaction, or (c) release of hydrogen molecules. The impedance parameters (not shown) obtained from the impedance spectra provide direct insights into the electrochemical capacitance and resistance associated with these steps. The charge-transfer resistance (Ret) is much smaller than the adsorption resistance ($R_a$) overall, which supports the DFT simulation results that the HER process fundamentally depends on the hydrogen adsorption step. Moreover, compared to the Au@$MoS_2$ electrodes, the $R_a$ of the w-Au@$MoS_2$ samples is significantly decreased. This is consistent with the simulation results, indicating the improvement of hydrogen absorption efficiency on the winged structures. In addition, it is worth noting that the barrier layer resistance, $R_f$, is much smaller on HOPG electrodes compared to those on the Si substrates; this increase in substrate conductivity explains the significant increase of the HER activity. Finally, based on the DFT and EIS study, it is believed that the excellent HER activity observed from the w-Au@$MoS_2$ on HOPG substrate can be attributed to the abundance of active edge sites engineered through the $MoS_2$ wings, which induces a small charge-transfer resistance (Ret) of HER, and also due to the improved conductivity originating from the contact between $MoS_2$ and the conductive substrate mediated by the Au nanoparticle cores.

Conclusions

In this Example, the seeding effect of Au nanostructures on the CVD synthesis of winged Au@$MoS_2$ heterostructures with promising HER performance was demonstrated. The key advantage of this technique is the highly-controllable growth of free-standing $MoS_2$ wings with desired morphology, which, on the one hand, leads to the creation of abundant edge-terminated active sites to drive the formation of hydrogen molecules, and on the other hand, enables efficient charge transport within the w-Au@$MoS_2$ structures through their favorable contact with the Au core. Compared to conventional approaches, such as metallic 1-T conversion and defect engineering, this method demonstrates the possibility to realize high-efficiency hydrogen production by using pristine $MoS_2$, which is a stable compound more amenable for future commercial development of water-splitting techniques. Moreover, the discovery of such seeding effect is applicable to other non-precious metal seed systems and thereby enables a broad strategy for designing and developing novel 2D layered structures for future heterogeneous catalysis, energy storage/conversion, and high-performance electronics.

Data and information indicated as not being shown may be found in U.S. Application No. 62/795,967, which is hereby incorporated by reference in its entirety.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more."

The foregoing description of illustrative embodiments of the disclosure has been presented for purposes of illustration and of description. It is not intended to be exhaustive or to limit the disclosure to the precise form disclosed, and modifications and variations are possible in light of the above teachings or may be acquired from practice of the disclosure. The embodiments were chosen and described in order to explain the principles of the disclosure and as practical applications of the disclosure to enable one skilled in the art to utilize the disclosure in various embodiments and with various modifications as suited to the particular use contemplated. It is intended that the scope of the disclosure be defined by the claims appended hereto and their equivalents.

What is claimed is:

1. A functionalized substrate comprising a substrate and a plurality of transition metal dichalcogenide (TMD) heterostructures on a surface of the substrate,
   each TMD heterostructure in contact with the surface of the substrate at a TMD heterostructure-substrate interface, each TMD heterostructure comprising
   a TMD shell over a heterogeneous nucleation site, thereby providing a core-shell heterostructure, the heterogeneous nucleation site composed of a heterogeneous nucleation material; and
   one or more TMD wings extending outwardly from the core-shell heterostructure and non-parallel to and above the substrate surface, wherein the one or more TMD wings originate from the core-shell heterostructure only at the TMD heterostructure-substrate interface.

2. The functionalized substrate of claim 1, wherein TMD wings of the plurality of TMD heterostructures are characterized by an average angle between a plane defined by the substrate surface and another plane defined by each TMD wing, the average angle in a range of from 30° to 90°.

3. The functionalized substrate of claim 1, wherein TMD wings of the plurality of TMD heterostructures are characterized by an average length in a range of from 50 nm to 500 nm.

4. The functionalized substrate of claim 1, wherein the one or more TMD wings have a thickness corresponding to 1, 2, or 3 monolayers of the transition metal dichalcogenide of the TMD heterostructures.

5. The functionalized substrate of claim 1, wherein each TMD heterostructure has multiple TMD wings which originate only at the TMD heterostructure-substrate interface.

6. The functionalized substrate of claim 5, wherein the multiple TMD wings of each heterostructure extend around a circumference of the core-shell heterostructure.

7. The functionalized substrate of claim 1, each TMD heterostructure further comprising a TMD sheet extending parallel to and along the substrate surface.

8. The functionalized substrate of claim 7, wherein the TMD sheet has merged with one or more TMD sheets from one or more neighboring TMD heterostructures.

9. The functionalized substrate of claim 1, wherein the heterogeneous nucleation material has an interface energy with the transition metal dichalcogenide of the TMD heterostructures that is below an interface energy of the heterogeneous nucleation material with the substrate or below an interface energy of the transition metal dichalcogenide with the substrate or both.

10. The functionalized substrate of claim 1, wherein the heterogeneous nucleation material is a precious metal, a non-precious metal, an inorganic material, an oxide, an organic residue, or a nanostructured carbon material.

11. The functionalized substrate of claim 10, wherein the heterogeneous nucleation material is the precious or the non-precious metal.

12. The functionalized substrate of claim 1, wherein the heterogeneous nucleation sites of the plurality of TMD heterostructures are islands having an irregular shape.

13. The functionalized substrate of claim 1, wherein the transition metal dichalcogenide has formula $MX_2$, wherein M is selected from Mo, W, Nb, Ta, Ti, and Re and X is selected from S, Se, and Te.

14. The functionalized substrate of claim 1, wherein the one or more TMD wings have a planar morphology.

15. The functionalized substrate of claim 14, wherein the one or more TMD wings have a thickness corresponding to 1, 2, or 3 monolayers of the transition metal dichalcogenide of the TMD heterostructures.

16. An electrocatalytic system comprising:
    an electrocatalytic cell configured to contain an aqueous electrolyte solution;
    a working electrode comprising the functionalized substrate of claim 1 and in contact with the aqueous electrolyte solution;
    a counter electrode in electrical communication with the working electrode; and
    a power source configured to apply an electrical potential across the working electrode and the counter electrode.

17. The system of claim 16, wherein TMD wings of the plurality of TMD heterostructures are characterized by an average angle between a plane defined by the substrate surface and another plane defined by each wing, the average angle in a range of from 30° to 90°, wherein each TMD heterostructure has multiple TMD wings which originate only at the TMD heterostructure-substrate interface, and wherein the heterogeneous nucleation sites of the plurality of TMD heterostructures are islands having an irregular shape.

18. A method of forming transition metal dichalcogenide (TMD) heterostructures, the method comprising:
    forming a plurality of heterogeneous nucleation sites on a surface of a substrate, the heterogeneous nucleation sites composed of a heterogeneous nucleation material; and
    exposing the heterogeneous nucleation sites to a vapor comprising a transition metal-containing precursor and a chalcogen-containing precursor under conditions to deposit a transition metal dichalcogenide on the heterogeneous nucleation sites via chemical vapor deposition (CVD) to form a plurality of TMD heterostructures, each TMD heterostructure in contact with the surface of the substrate at a TMD heterostructure-substrate interface, each TMD heterostructure comprising
        a TMD shell over a heterogeneous nucleation site, thereby forming a core-shell heterostructure, and
        one or more TMD wings extending outwardly from the core-shell heterostructure and non-parallel to and above the substrate surface, wherein the one or more TMD wings originate from the core-shell heterostructure only at the TMD heterostructure-substrate interface.

19. The method of claim 18, wherein the conditions comprise using a mass of the chalcogen-containing precursor in a range of from 300 mg to 500 mg and using a flow rate of a carrier gas in a range of from 20 sccm to 50 sccm.

20. A method of using the system of claim 16, the method comprising applying the electrical potential across the working electrode and the counter electrode to induce a reduction reaction at the working electrode to produce $H_2$.

* * * * *